United States Patent [19]

Cox

[11] Patent Number: 4,663,932
[45] Date of Patent: May 12, 1987

[54] DIPOLAR FORCE FIELD PROPULSION SYSTEM

[76] Inventor: James E. Cox, 5455 Romaine St., Los Angeles, Calif. 90038

[21] Appl. No.: 401,526

[22] Filed: Jul. 26, 1982

[51] Int. Cl.⁴ .............................................. F03H 5/00
[52] U.S. Cl. ..................................... 60/200.1; 60/202; 313/359.1; 315/5.41
[58] Field of Search ..................... 60/202, 203.1, 200.1; 313/359.1, 361.1, 362.1; 315/111.01, 5.41, 5.42

[56] References Cited

U.S. PATENT DOCUMENTS

| | | | |
|---|---|---|---|
| 3,095,163 | 6/1963 | Hill | 244/12 |
| 3,322,374 | 5/1967 | King | 244/62 |
| 3,324,316 | 6/1967 | Cann | 310/11 |
| 3,334,022 | 9/1967 | Eckert | 313/63 |
| 3,353,354 | 11/1967 | Friedman et al. | 60/203.1 |
| 3,371,490 | 3/1968 | Haslund | 60/202 |
| 3,505,550 | 4/1970 | Levoy et al. | 313/63 |
| 3,527,055 | 9/1970 | Rego | 60/224 |
| 3,662,554 | 5/1972 | Broqueville | 60/202 |
| 3,678,306 | 7/1972 | Garnier et al. | 310/11 |
| 3,735,591 | 5/1973 | Burkhart | 60/202 |
| 3,866,414 | 2/1975 | Bahn | 60/202 |

OTHER PUBLICATIONS

Jahn, R. G., *Physics of Electric Propulsion*, McGraw-Hill, 1968, pp. 196-198.
Cox, J. E., "Electromagnetic Propulsion without Ionization", ATAA/SAE/ASME 16th Joint Propulsion Conference Hartford, Conn., 1980.

Primary Examiner—Louis J. Casaregola
Attorney, Agent, or Firm—Daniel J. Meaney, Jr.

[57] ABSTRACT

A dipolar force field propulsion system having a alternating electric field source for producing electromotive lines of force which extend in a first direction and which vary at a selected frequency and having an electric field strength of a predetermined magnitude, a source of an alternating magnetic field having magnetic lines of force which extend in a second direction which is at a predetermined angle to the first direction of the electromotive lines of force and which cross and intercept the electromotive line of force at a predetermined location defining a force field region and wherein the frequency of the alternating magnetic field substantially equal to the frequency of the alternating electric field and at a selected in phase angle therewith and wherein the magnetic field has a flux density which when multiplied times the selected frequency is less than a known characteristic field ionization potential limit; a source of neutral particles of matter having a selected dipole characteristic and having a known characteristic field ionization potential limit which is greater than the magnitude of the electric field and wherein the dipoles of the particles of matter are capable of being driven into cyclic rotation at the selected frequency by the electric field to produce a reactive thrust, a vaporizing stage which vaporizes said particles of matter into a gaseous state at a selected temperature, and a transporting system for transporting the vaporized particles of matter into the force field defined by the crossing electromotive lines of force and the magnetic lines of force.

21 Claims, 53 Drawing Figures

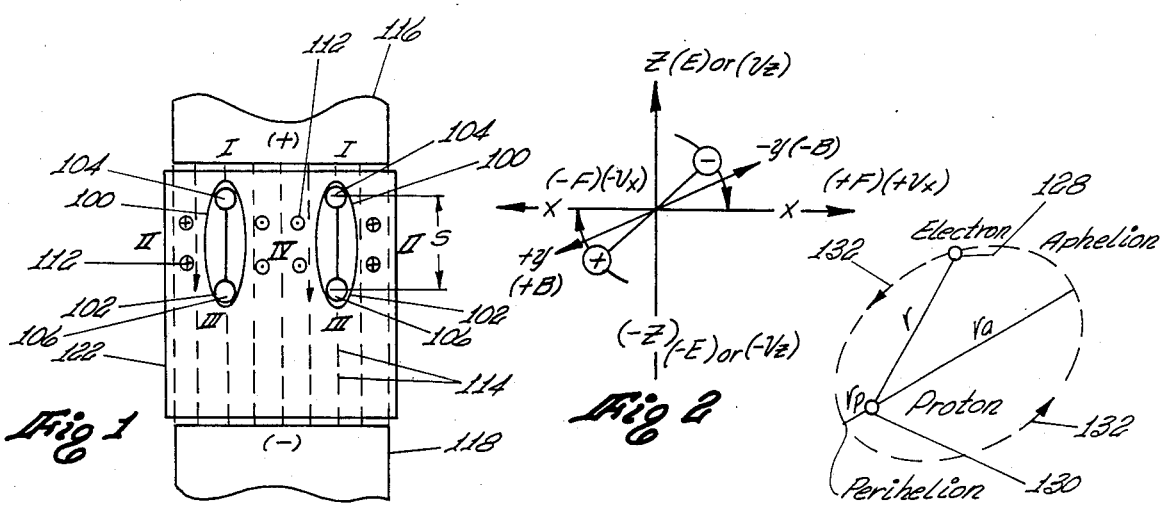
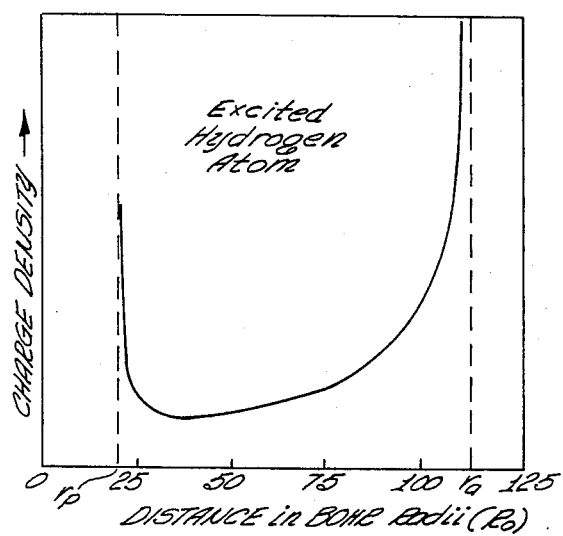
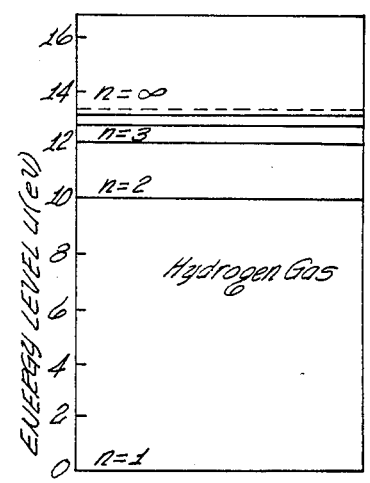
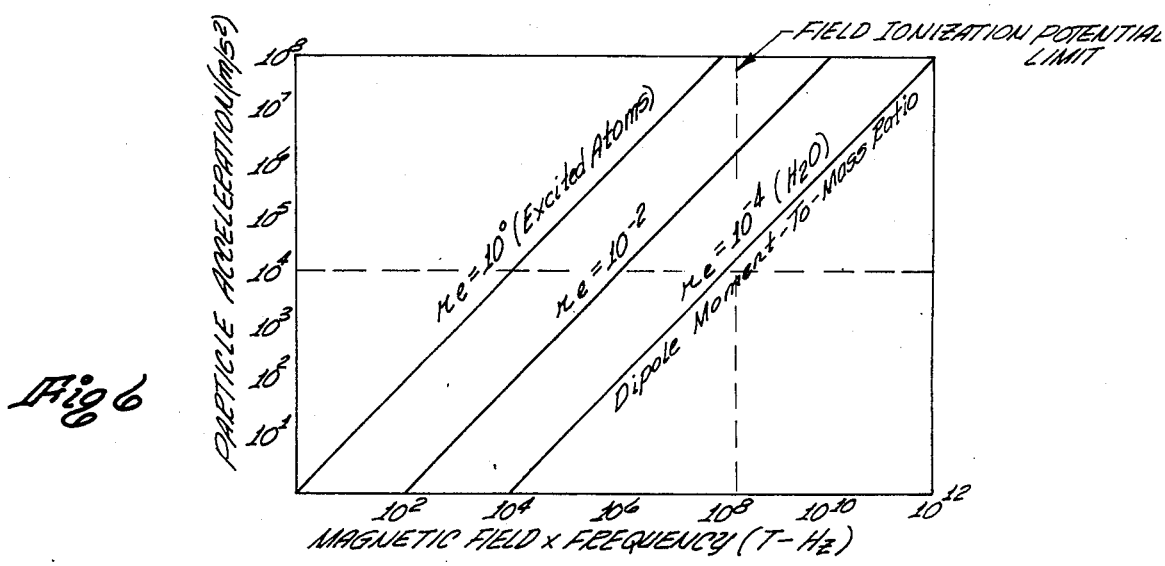

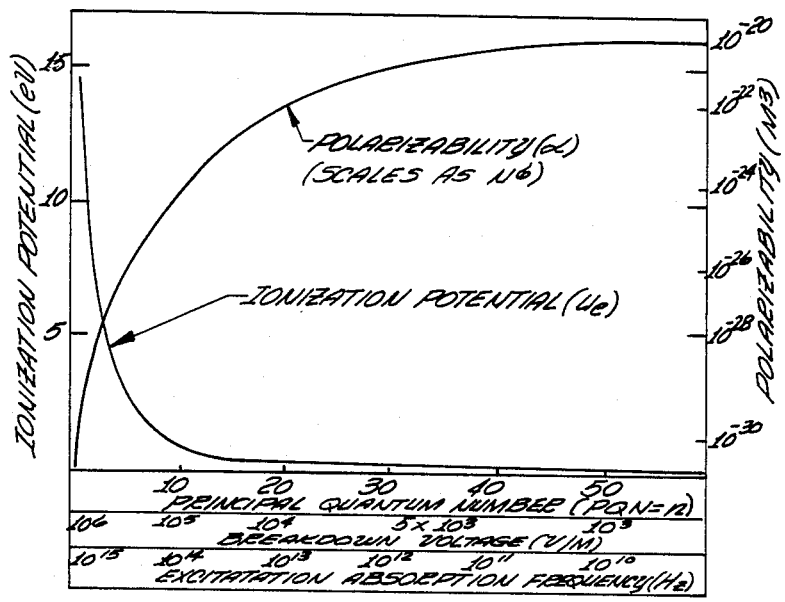
*Fig 5*
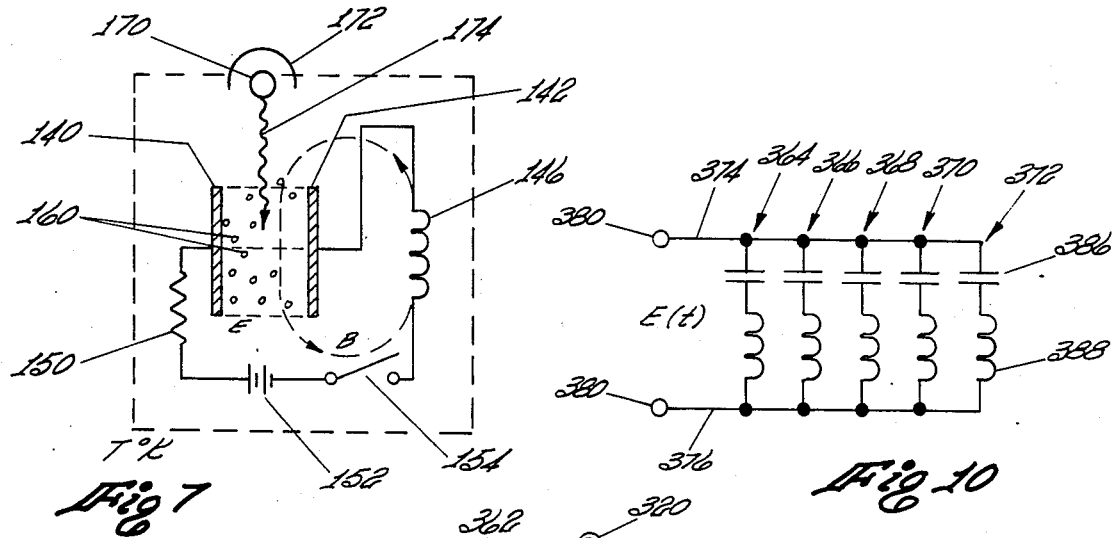
*Fig 7*     *Fig 10*
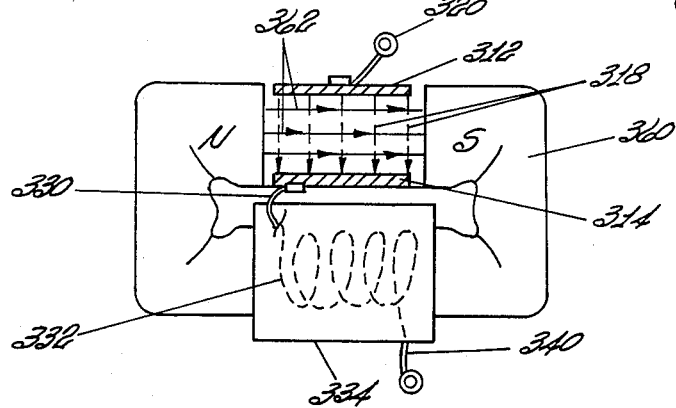
*Fig 9*

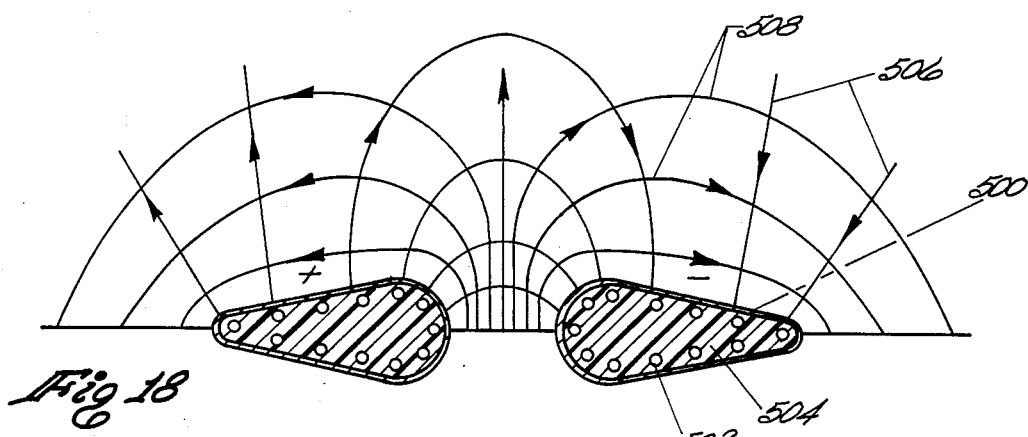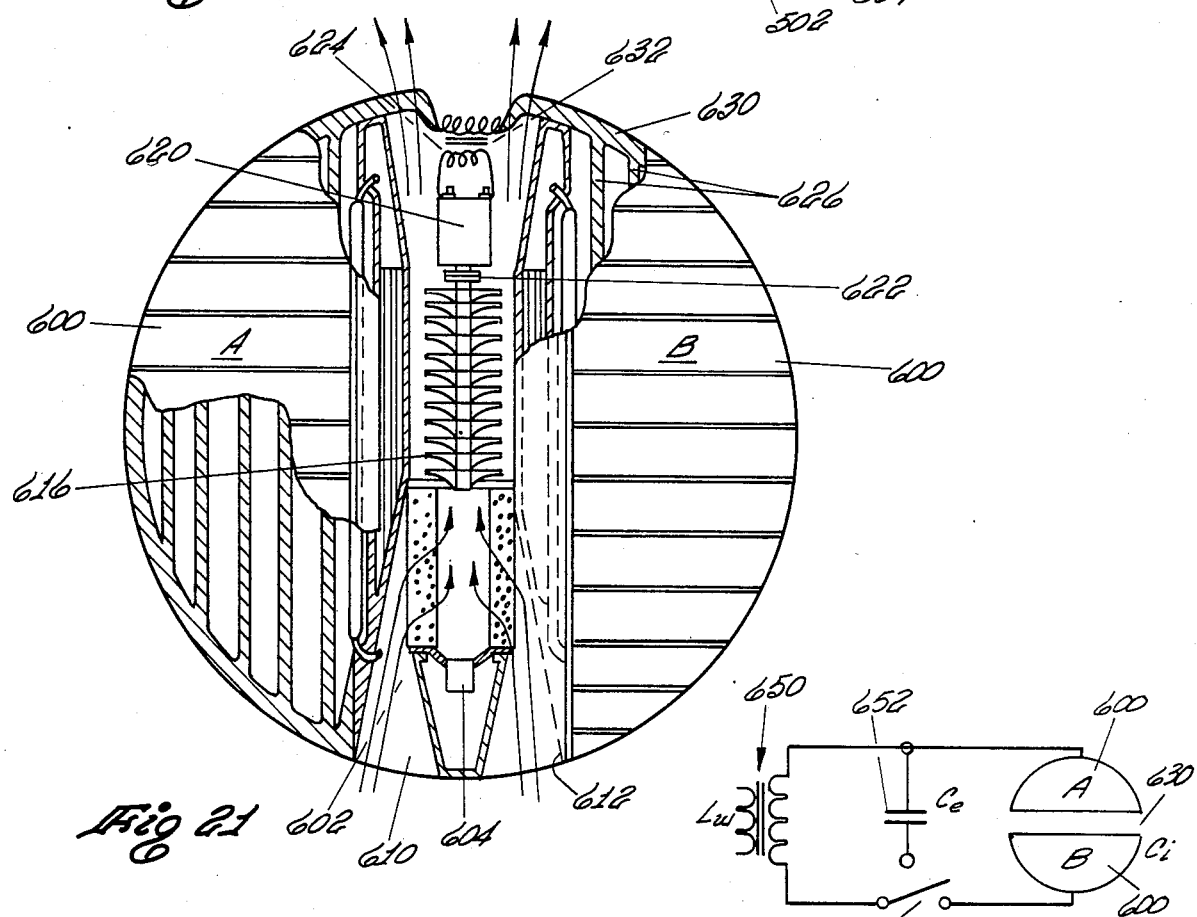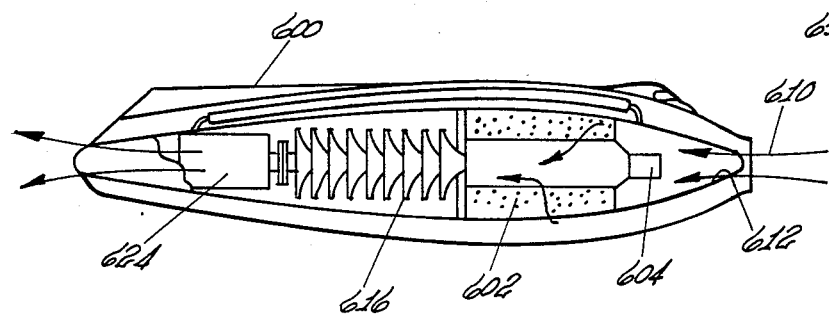

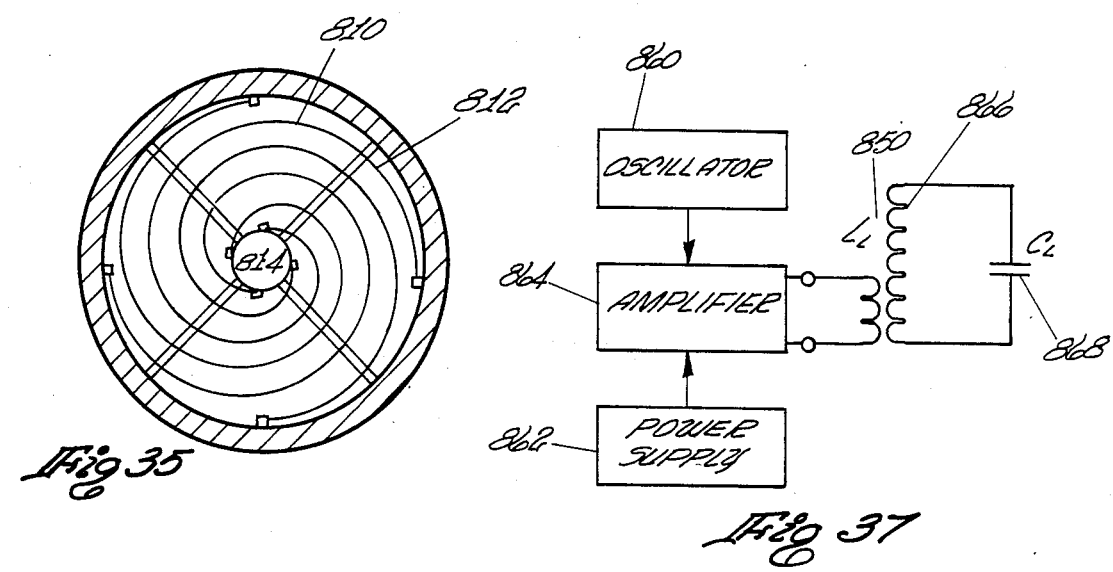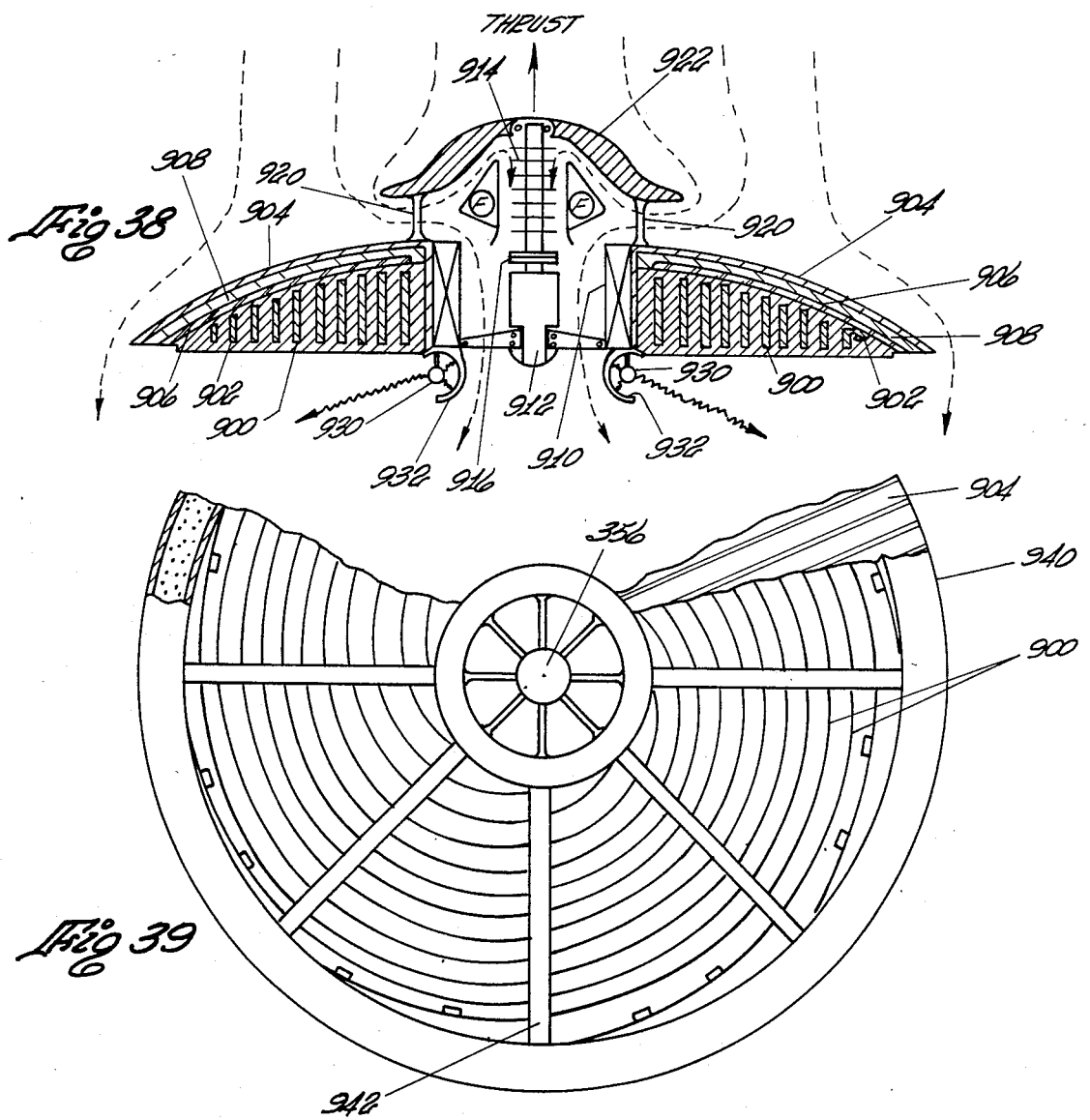

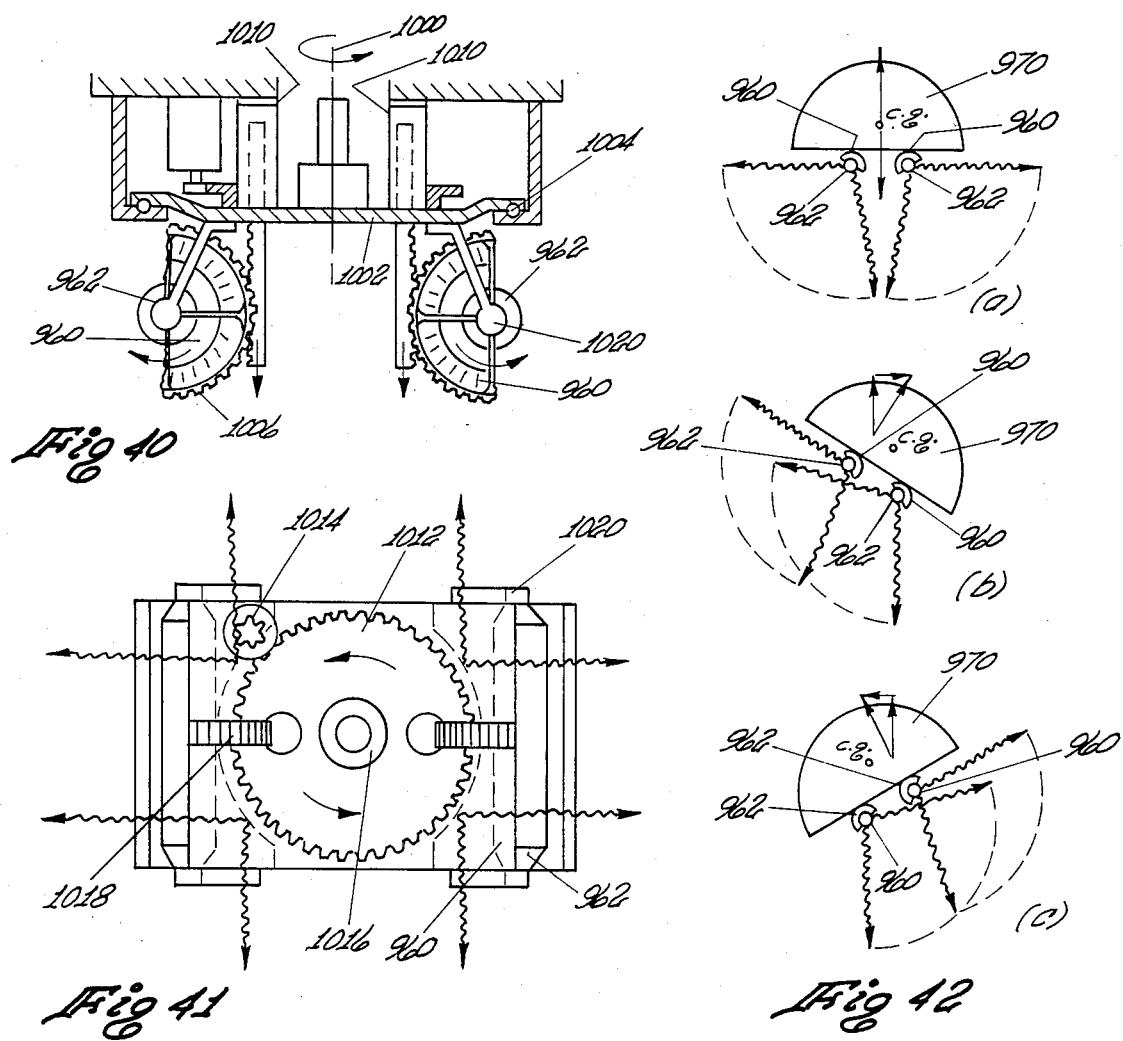
Fig 40
Fig 41
Fig 42
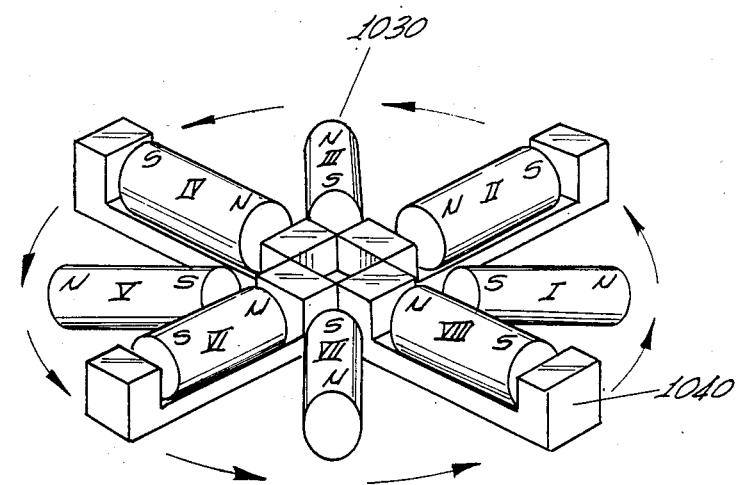
Fig 43

DIPOLAR FORCE FIELD PROPULSION SYSTEM

BACKGROUND OF THE INVENTION

1. Field of the Invention

The present invention relates in general to a system and method for producing a reactive force on an aerospace vehicle to cause rotation or vibration of dipoles of neutral particles having a selected electrical dipole characteristic and more particularly to a dipolar force field propulsion system for a aerospace vehicle utilizing a crossed electric E field and a magnetic B field for establishing a spatial force field region wherein a control means establishes a predetermined spatial and time relationship between the alternating electric field, alternating magnetic field and dipole rotation for a selected frequency to produce an reactive thrust.

2. Description of the Prior Art

In spacecraft propulsion systems, the use of chemical rocket engines which use combustion of chemical fuels to produce a large amount of thrust necessary to lift loads from the earth's surface is known. The term "thrust" is defined to mean the amount of propulsive force developed by a propulsion engine and is typically related to a rocket engine that is used for boosting a space vehicle from the earth's surface into orbit. The known space propulsion systems must have sufficient thrust to raise the spacecraft from the earth's surface and that thrust must be greater than the weight of the vehicle to be lifted from the earth's surface and placed into orbit.

Once the spacecraft has been boosted into space or orbit, the required spacecraft thrust is minimal compared to the thrust required for lifting the vehicles from the earth's surface.

When a spacecraft is in space or in orbit, it is desirable to have the ratio of thrust produced to the rate of consumption of the fuel to be high as possible and this is generally referred to as "specific impulse." In space or in orbit, a spacecraft propulsion system having a high "specific impulse" capability is highly desirable.

Thus, it is known in the art of space propulsion systems that the chemical rocket engines are capable of providing the requisite thrust necessary to lift large payloads from the earth's surface into orbit.

Once the spacecraft and its payload is in orbit, it is desirable for the spacecraft propulsion system to be able to change the orbit, speed and/or orbital position of the spacecraft with a "specific impulse" propulsive force.

A number of propulsion systems have the capability of providing "specific impulse" thrust for changing the orbit, speed and/or orbital position of a spacecraft.

One such known propulsion engine is generally referred to as "electrostatic propulsion systems" wherein the thrust is created by electrostatic acceleration of ions created by an electron source in an electric field. Electrostatic propulsion systems have very high specific impulse but have limited thrust capacities. Where an excessively large amount of thrust is required, the size and weight of the electrostatic propulsion systems become excessive. Examples of known electrostatic propulsion systems are disclosed in U.S. Pat. No. 3,866,414; U.S. Pat. No. 3,537,266 and U.S. Pat. No. 3,095,163. Electrostatic propulsion systems include electrostatic engines such as ion engines as evidenced by the above-described United States patents.

Another type of known space propulsion systems are generally referred to as "electric arc" engines. Electric arc engines or propulsion systems use an electric arc to heat a propulsion gas which is then passed to a standard rocket nozzle to provide thrust. Electric arc propulsion systems are capable of generating considerable amounts of thrust and have specific impulse thrust greater than those of chemical engines. However, the specific impulse thrust levels of electric arc engines are lower than the specific impulse thrust of electrostatic propulsion systems. Typical electrothermal or electric arc propulsion systems are disclosed in a book by Robert Jahn entitled *"Physics of Electric Propulsion"*, McGraw Hill, 1968.

Another known type of spacecraft propulsion system is generally referred to as electromagnetic propulsion systems which includes magnetohydrodynamic (MHD) thruster or magnetoplasmadynamic (MPD) thruster. The MHD or MPD thrusters are capable of providing both high thrust density and high specific impulse. The MHD or MPD thrusters utilize a propellant gas which is ionized to form a plasma which is accelerated by magnetic and electric fields and is then passed through an expansion nozzle to provide thrust. In a MHD thruster or MPD thruster, the plasma is a body of gas which comprises a substantial number of free electrons and ions, but has an overall neutral electrical charge providing a plasma which is electrically conductive. The known MHD or MPD thrusters utilize the interaction of magnetic fields produced by electrical currents and conductors on the spacecraft with an electrically conductive environment to produce a reaction thrust. Several typical MHD thrusters or MPD thrusters are disclosed in U.S. Pat. No. 3,735,591; U.S. Pat. No. 3,662,554; U.S. Pat. No. 3,535,586; U.S. Pat. No. 3,505,550; U.S. Pat. No. 3,371,490; U.S. Pat. No. 3,527,055; U.S. Pat. No. 3,343,022 and U.S. Pat. No. 3,322,374.

It is also known in the art to combine a jet propulsion power plant with a magnetoplasmadynamic generator to produce a hybrid propulsion system. One such propulsion system is disclosed in U.S. Pat. No. 3,678,306.

The use of a controlled fusion device which generates electrical energy utilizing an ionized gas plasma in a space propulsion system is disclosed in U.S. Pat. No. 3,324,316.

The design of plasma propulsion systems having special magnetic fields for controlling the specific impulse characteristics of the plasma propulsion device is disclosed in U.S. Pat. No. 3,191,092.

In addition to the above described space propulsion systems, the inventor of the present application published an article entitled "Electromagnetic Propulsion Without Ionization" which appeared in the AIAA/SAE/ASME 16th Joint Propulsion Conference which was held on June 13, 1980 to July 2, 1980 in Hartford, Conn. The paper presented at the above-described 16th Joint Propulsion Conference disclosed the concept of electromagnetic propulsion without ionization. Specifically, the paper disclosed that when an alternating electric field is applied to a polarized or polarizable material, the dipole of the material can be made to rotate at high frequency. If an alternating and synchronized magnetic field is supplied at right angles to the electric field, a Lorentz force is generated which propels the dielectric fluid without the necessity for ionization and the consequential energy losses arising from the ionization process. The thrust so generated is proportional to the polarization, the frequency of the dipole rotation and the magnetic field strength. The propellant selected for use as the polarizable material is characterized by having a high permanent molecular dipole movement-to-mass ratio and is accelerated by Lorentz forces to useful exit velocities. A spacecraft having the induced dipole electromagnetic propulsion system is accelerated by Newton's Third Law of Motion, or the reactive thrust principal.

SUMMARY OF THE INVENTION

The present invention relates to a novel, unique and improved dipolar force field propulsion system. In the prefered embodiment of the present invention, the dipolar force field propulsion system includes means for generating an alternating electric field having its electromotive lines of force extending in a selected direction. The alternating electric field varies at a selected frequency and has an electric field strength of a predetermined magnitude. A means for generating a rotating or alternating current magnetic field is provided with the electromagnetic lines of force extending in a direction which is at a selected angle relative to the selected direction of the electromotive lines of force. The electromagnetic lines of force cross and intercept the electromotive lines of force at a predetermined location to define a spatial force field region. The frequency of the alternating magnetic field is substantially equal to the selected frequency of the alternating electric field and has a predetermined phase angle therebetween. The magnetic field has relatively high flux densities in the order of a fraction of one tesla or more. The propellant material is a source of neutral particles of matter having stabilized, electrically induced or permanent dipoles having preselected internal breakdown characteristic which is greater than the magnitude of the applied electric field. The dipoles of the matter are capable of being driven into controlled rotation at the selected frequency by the alternating electric field and crossing the alternating electromagnetic field. A means for vaporizing the matter into a gaseous state yet below the thermal ionizational level thereof and for transporting the vaporized material in the gaseous state into the spatial force field region which is defined by the crossed electromotive lines of force and electromagnetic lines of force. The alternating cross field formed by the electromotive lines of force and the electromagnetic lines of force cause the dipoles to rotate at the selected frequency and to produce an acceleration force which is substantially normal to the plane of the electromotive and the electromagnetic lines of force to produce a reactive thrust. A control means which is operatively coupled to the means for generating the alternating electric field and to the means for generating an alternating magnetic field and which is responsive to the dielectric properties of the vaporized matter located in the spatial force field region having a well-defined relation between the electric field, electromagnetic field and dipole orientation for any selected frequency.

The known prior art space propulsion systems have inherent limitations in terms of providing sufficient thrust based upon the mass and weight of a propulsion system on the earth's surface in order to lift a spacecraft from the earth's surface and to place the same into orbit or space. The primary limitation can be characterized specifically by the mass of propellant required, by weight, to the mass of payload to be placed into space. Known spacecraft propulsion systems utilizing a chemical engine generally require propellants wherein the aggregate weight of the propellant is twenty to thirty times the aggregate weight of payload to be lifted from the earth's surface and to be placed into orbit.

The known electrostatic propulsion systems or ion propulsion systems and the electric arc propulsion systems are limited to operation in the vacuum of space and provide satisfactory high "specific impulse" thrust but are unsatisfactory for providing a substantial amount of thrust as required for liftoff of a spacecraft. In order to generate sufficient thrust for lifting of a payload from the earth's surface into orbit, the size, weight and complexity of the spacecraft propulsion systems limit the desirability of using the same in such a spacecraft and to provide the necessary "specific impulse" thrust required for changing orbital speed, direction and/or position.

In the known MHD or MPD propulsion systems, it is necessary to provide sufficient energy in order to ionize the propellant. The energy required to ionize the propellant, which is typically easily ionizable gas, reduces the overall efficiency of the propulsion systems and requires substantial cooling systems in order to obtain the proper operating conditions to increase the reliability and lifetime of such propulsion systems.

In the known MHD propulsion systems, it is necessary to include a seeding propellant which is injected into the hot gases wherein the seeding material is generally a low ionization potential compound such as, for example, potassium or cesium.

The present invention overcomes the inherent limitations and problems associated with the known spacecraft propulsion systems.

One advantage of the present invention is that a unique, novel and improved dipolar force field propulsion system utilizes a propellant in the form of a vaporized gaseous matter which is in an unionized state. The reactive thrust can be developed by controlling the operating characteristics of the crossed alternating electric field and alternating current magnetic field which defines the spatial force field region adapted to have the vaporized polarizable material, which is not ionized, transported thereto.

Another advantage of the present invention is that the electronic excitation level of the polarizable dipole material can be increased either prior to or after the vaporization thereof into a gaseous state to improve the operating efficiency of the dipole force field propulsion system.

A yet further advantage of the present invention is that a means are provided for generating a reactive thrust which is adapted for propelling a spacecraft from the earth's surface, into orbit and subsequently into space wherein the initial thrust and specific impulse can be provided which are equal to or greater than those provided by the known spacecraft propulsion systems.

A still yet further advantage of the present invention is that a unique and novel method for propelling a spacecraft with a reactive thrust derived from using a propellant comprising neutral particles of matter having an electric dipole characteristic and a breakdown characteristic which is greater than the magnitude of an applied electric field.

A still yet further advantage of the present invention is that the phase angle between the alternating electric field and the alternating magnetic field can be varied so as to control the magnitude of the reactive thrust produced by the rotation of the dipoles of material.

A still yet further advantage of the present invention is that a unique and novel spacecraft having a "X-wing" configuration which includes means for exciting the energy level of the polarizable or dipole material to an excited level wherein the excited atoms of material when used as a propellant is capable of rendering both thrust and specific impulses of thrust at controlled levels which is directly proportional to the excited state of the gaseous material.

A still yet further advantage of the present invention is that the propulsion efficiency of the inductive dipolar force field propulsion system increases as a function of mass ratio and can approach acceptable operating efficiencies.

A still yet further advantage of the present invention is that the excitation power can be a microwave source having a selected frequency which can be located either internal or external to the spacecraft. Under certain idealized conditions, the frequency of the microwave radiation source can be precisely selected relative to the frequency of rotation or absorption characteristics of the dipole material such that substantially all of the microwave radiation transmitted to the spacecraft from an external source can be fully absorbed without reflecting any part thereof.

A still yet further advantage of the present invention is that a MHD electric power generator can be utilized on board of the spacecraft to generate the electrical energy required to produce the electric and magnetic field which is utilized to establish the spatial force field area for producing the reactive thrust from the interaction of the crossed electric field and magnetic field on the induced dipole material occupying this region.

A still yet further advantage of the present invention is that cryogenic cooling of superconductive magnets can produce extremely high, dense magnetic fields in the order of one tesla or more. By controlling this field strength as well as the switching rate or frequency of the magnetic fields, both the efficiency of the dipole propulsion system and the amount of thrust produced can thereby be determined.

A still yet further advantage of the present invention is that a electromagnetic propulsion system utilizing the teachings of this invention can produce in the order of $10^6$ pounds of thrust level using known or anticipated power sources and known superconductive magnetic materials.

A still yet further advantage of the present invention is that a shuttle aircraft can be designed utilizing a hybrid propulsion system wherein the lift and thrust are accomplished by aerodynamic, electromagnetic and chemical rocket propulsion systems so as to exploit the characteristics of each system at an optimum time during trajectory of spacecraft travel.

A still yet further advantage of the present invention is that the spacecraft propulsion system disclosed herein is capable of utilizing the earth's atmosphere as a propellant having an appropriate excitation level required in order to initiate the polarization dipole reactive thrust generation for purposes of lifting a spacecraft from the earth's surface into orbit. Once the spacecraft has been propelled into orbit and then into deep space, the dipole force field propulsion system is capable of utilizing matter in interstellar space as a propellant without the necessity of ionizing the same in order to develop the reactive thrust necessary to propel a spacecraft into deep space.

A still yet further advantage of the present invention is that the dipolar force field propulsion system provides a method for accelerating neutral particles of matter without the creation of an ionized or plasma state. As a result, a force density can be established in a gas over a large distance without the restriction of skin depth or Debye lengths. This property, in addition to the recycling of excitation radiation and rebounding collision processes, offers the potential for the creation of a class of more efficient propulsion systems for aerospace vehicles.

A still yet further advantage of the present invention is that the dipolar force field propulsion system operates at lower jet velocities at large volumetric mass flow rates. Therefore, greatly reduced noise levels are possible. The field extends beyond the structure of the aerospace vehicle itself to move the mass and thereby permits operation in more rarified environments, such as higher altitudes, where pressures and temperatures are lower, permitting high Rydberg excitation states to exist.

A still yet further advantage of the present invention is that the aerospace vehicle's structure can be designed such that electronic control of thrust direction can be achieved which can be changed instantly with the flick of a switch. The use of electronic switching can provide increased maneuverability and faster response reaction times. Further, electric power can be provided to the aerospace vehicle by super conductive radio frequency generators or by the process of magnetohydrodynamics, or by beamed power from ground or orbiting power stations. The existance of an excited gas field around the vehicle can be used in absorbing offending external microwave beams as well.

A still yet further advantage of the present invention is that it appears that the ejection of electromagnetic momentum will provide for some capability of producing a small thrust in the vacuum of space itself.

A still yet further advantage is that the apparatus and method disclosed herein can be used for accelerating particles of matter and have wide potential applications for isotope separations, particle beam devices, chemical accelerators, nuclear devices, molecular beam devices and the like.

BRIEF DESCRIPTION OF THE DRAWINGS

These and other objects and advantages of the invention, together with the various features and advantages, can be readily understood from the following more detailed description of the prefered embodiment taken in conjunction with the accompanying drawing in which:

FIG. 1 is a diagramatic representation of electrodes for establishing an alternating electric field in the presence of a alternating magnetic field to define a spatial force field region for inducing rotation of a dipole to produce a reactive thrust;

FIG. 2 is a vector diagram of the Lorentz forces acting on each charge at the end of a dipole;

FIG. 3a is a diagramatic representation of the elliptical orbit generated by an electron relative to its nucleus showing the aphelion point and the perihelion point of the orbits;

FIG. 3b is a graph of the charge density of the atom plotted as a function of electron distance in Bohr radii ($R_o$) depicting the variance in charge density as a function of radius of the orbit;

FIG. 4 is a plot of the electronic energy levels of hydrogen gas as a function of the principal quantum number (n) of an excited hydrogen atom;

FIG. 5 is a graph of the polarizability of an atom at various levels of excitation and reduced ionization potential and depicting the excitation frequency and breakdown voltage of the dipole material;

FIG. 6 is a graph showing the particle accelerations which can be obtained for dipolar molecules in a plurality of excited states;

FIG. 7 is a diagramatic representation of a simplified dipolar force field propulsion system utilizing the teachings of the present invention;

FIG. 9 is a diagramatic representation is one view of one of the stages of the dipolar force field propulsion system illustrated in FIG. 8;

FIG. 10 is an electrical schematic diagram of the electrical component connections which includes therewith a representation of the capacitance effect of the vaporized propellant located in the spatial force field region;

FIG. 18 is a diagramatic representation, in cross section, showing the details of wing construction of an aerospace vehicle showing in particular the structure of the magnetic field and electric field for establishing an external spatial force field region using atmospheric gas as the propellant;

FIG. 21 is a top view, partially in cross section, of a discoid shaped vehicle having a rotating nuclear bed reactor and a single wing showing the construction thereof adapted to provide an external force field region;

FIG. 22 is a side view, partially in cross section of the discoid shaped vehicle of FIG. 21;

FIG. 24a is a simplified electrical schematic diagram showing the internal and external capacitive arrangement of the discoid vehicle of FIG. 21;

FIG. 35 is a side view, partially in cross section, showing a two stage inductive dipolar force field propulsion system;

FIG. 37 is a simplified block diagram showing the overall electrical power circuit for the inductive dipolar force field propulsion system of FIG. 35;

FIG. 38 is a diagramatic representation partially in cross section of a vertical takeoff and landing vehicle (VTOL) using the inductive dipoler force field propulsion system;

FIG. 39 is a partial top plan view of the VTOL spacecraft illustrated in FIG. 38;

FIG. 40 is a pictoral representation partially in section showing a means for controlling the region of the excitation of gas molecules in the atmosphere beneath the VTOL spacecraft to bring about thrust and direction control;

FIG. 41 is a top plan view of the VTOL spacecraft illustrated in FIG. 40;

FIGS. 42a, 42b and 42c depict the effect of controlling the excitation source for increasing the level of excitation of gas atoms in the atmosphere in the vicinity of a VTOL vehicle to provide thrust for causing the vehicle to be lifted and directionally controlled from earth, and adapted to be turned to the right or to be turned to the left, respectively;

FIG. 43 is an isometric view showing a means for producing an alternating magnetic field using D.C. superconductive magnetic coils;

DESCRIPTION OF THE PREFERRED EMBODIMENT

Figure 8:
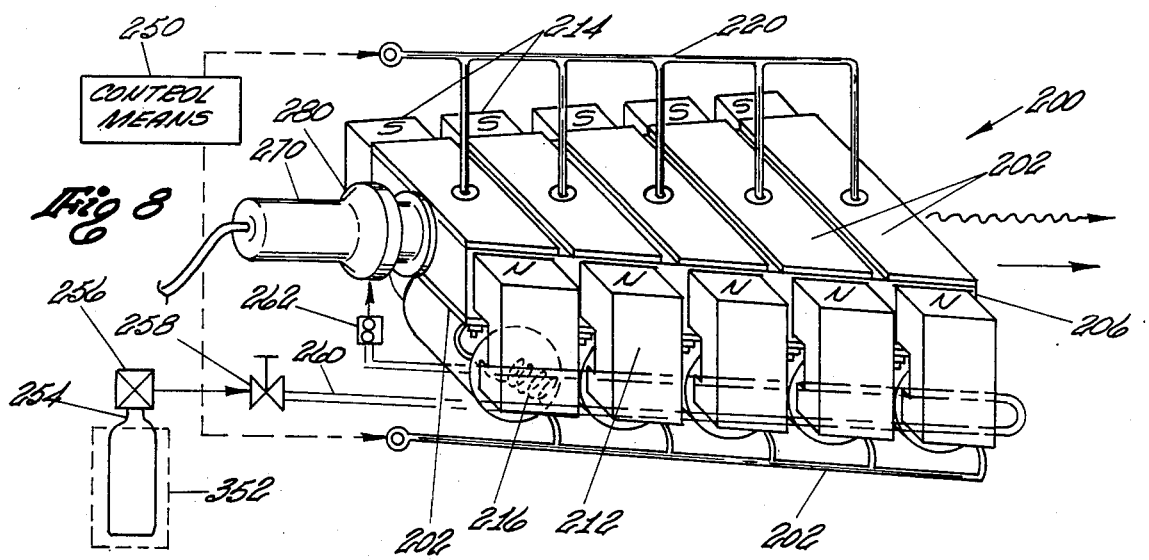
FIG. 8 is a schematic representation of one embodiment of the present invention having a plurality of stages, each of which have linear spatial force field regions and utilizing a lasar as a source of excitation of the gas, and cryogenic cooling to increase the efficiency of the dipolar force field propulsion system.

Before commencing with a detailed description of the preferred embodiment and alternate embodiments, a brief description of the electrodynamics of moving media particularly with respect to a model of a dipolar fluid will be first considered.

A description of the model of a dipolar fluid and the resulting equations developed by a force acting on the dipolar fluid is set forth in a book entitled *Electrodynamics of Moving Media* by Paul Penfield, Jr., and Hermann A. Haus which is published as Research Monograph Number 40 by the MIT Press, Cambridge, Mass. at pages 47 through 53. As stated in the description of the model of a dipolar fluid in the above-described Penfield and Haus reference, in a uniform field, the force density can be defined by the following formula:

$$f_k = \dot{P} \times B \qquad (1)$$

wherein
$f_k$ = Force Density (Newtons/Cubic Meter)
$\dot{P}$ = Polarization Current Density of Dipolar matter (in A/M$^2$); and
B = Magnetic Field Induction (Tesla)

From the formula identified as equation (1) above, the force density is a function of the polarization current of the dipolar material times the magnetic field intensity. Polarization is defined, for purposes hereof, as the average electric dipole moment per unit volume. The derivative thereof with respect to time yields current density.

Experiments have been conducted to verify that mechanical forces can be developed based upon the above-described formula and the results of such experiments were disclosed in an article entitled "Mechanical Forces of Electromagnetic Origin" by G. B. Walker and G. Walker of the Electrical Engineering Department, University of Alberta, Edmonton, Canada, which was published in a periodical entitled "Nature" at Volume 23, Sept. 30, 1976. The experiments disclosed that the above-identified formula results in a reactive force being generated.

Equation (1) above is a compact mathematical expression which represents the underlying microscopic physical forces taking place at the atomic level. This understanding is essential in order to appreciate and understand the teachings of the present invention.

Referring to FIG. 1, a pair of electric dipoles 100 are shown consisting of oppositely charged ends, 102 and 104, end 102 being the positively charged end and end 104 being the negatively charged end. The two dipole ends 104 and 106 are displaced a fixed distance "s" apart from each other and are free to rotate about an axis 106 which is the positively charged end 102. The dipoles are shown pictorially to be an elongated shaft terminating in a sphere at each end thereof with the charges concentrated at each end thereof. In fact, in an actual ground state atom, the electrons exist as a cloud shifted from the nucleus.

As illustrated in FIG. 1, the dipoles are situated in a crossed electric field and magnetic field referred to in the art as a Lorentz field. The electric field can be generated by a means for generating an alternating electric field having its electromotive lines of force extending in a first or selected direction. The alternating electric field varies at a selected frequency and the electric field is selected to have an electric field strength of a predetermined magnitude. In the preferred embodiment, the magnitude of the electric field is less than the known characteristic field ionization of particle or particles of matter having the dipole formed therein.

FIG. 1 includes a means for generating an alternating magnetic field having its magnetic lines of force extending in a second direction which is at a predetermined angle, which in the preferred embodiment, is at 90°, to the first or selected direction of the electromotive lines of force defining the electric field. The pole face of the magnet is shown as 122. The magnetic lines of force intercept the electromotive lines of force at a predetermined location to define a spatial force field region. The frequency of oscillation of the alternating magnetic field is substantially equal to the selected frequency of the alternating electric field. Also, the oscillation of the alternating magnetic field magnitude is at a selected phase angle with the alternating electric field. As will be developed further herein, the magnetic field has a flux density which when multiplied times the selected frequency produces a Tesla-Hertz level which is less than the selected field ionization limit of a particle placed into the field.

In FIG. 1, the electric field shown by dashed lines 114, is generated by a pair of electrodes 116 and 118 with electrode 116 being the positively charged electrode and with electrode 118 being negatively charged at an instant of time. The voltage applied to the electrode cyclically varies as a cosine function, Cos (wt). The magnitude of the electric field is chosen so as not to cause electrical breakdown of the dipole, that is to cause separation of the opposite ends of the dipole from each other. If the magnitude of the electric field is less than the electrical breakdown of the dipole, the electrons remain bound to each other at a fixed distance "s" apart. Likewise, a magnetic field B, shown by vectors 112, is applied to the dipoles. Preferably, the magnetic field has a flux density which is as intense as is practically possible based upon the frequency of the alternating magnetic field and the Tesla-Hertz level thereof relative to the selected field ionization limits of the particle of matter subjected to the force field. The magnetic field applied to the dipoles varies as a sine function, Sin (wt).

Both electrode pair 116 and 118 and the magnetic field 112 are controlled to establish a predetermined spatial and time relationship at the selected frequency of the alternating electric field, the alternating magnetic field and the ultimate dipole rotation orientation.

When the electric field E is initially applied to dipoles 100, the dipoles 100 will experience a torque that will twist them into an orientation such that they are parallel to the electric field lines 114 with the opposing charges facing each other at a given electrode. The dipole may rotate in either a clockwise or counterclockwise direction depending on its initial position. However, as will become apparent, the direction of rotation is immaterial to the translatory forces that are to be generated on the dipoles 100 as a whole. If an alternating electric field, E, is applied to the electrodes 114 and 116, the dipoles 100 can be made to rotate or oscillate about its center mass, which is generally the positively charged end of the dipole. The frequency of rotation is in the megacycle range and the dipoles' rotation follows the frequency of the electric field. Thus, the dipole is driven into cyclic motion, which may be rotational or vibrational, by the electric field. When the alternating magnetic field is imposed on the dipoles, forces are exerted on each charge of the dipole given by the following Lorentz equation:

$$F = qv \times B \tag{2}$$

where
q = charge on each end of dipole (coulombs);
v = tangential velocity of each charge (m/s); and
B = magnetic field in teslas.

As shown in FIG. 2, the force acts in a direction perpendicular to the plane of the electric and magnetic fields, which is along the X axis in FIG. 2. For velocity components colinear with the magnetic field lines, which is along the Y axis in FIG. 2, no force is produced in the X plane since the cross-product of the velocity and magnetic field is equal to 0. Only velocity components perpendicular to the magnetic field generates forces in the X and Z plane. The forces that are generated as the dipole is rotated through each quadrant in FIG. 2 can be summarized by analyzing equation (2) at each quadrant location and a chart thereof as set forth hereinbelow.

TABLE 1

| Quadrant Location | Forces on Negative Charge (Clockwise Rotation) | | | | | |
|---|---|---|---|---|---|---|
| | Q | B(Y) | V(x) | V(z) | F(z) | F(x) |
| I | −e | 0 | +wR | 0 | 0 | 0 |
| II | −e | −MAX(Y) | 0 | +wR | 0 | +qVB |
| III | −e | 0 | −wR | 0 | 0 | 0 |
| IV | −e | +MAX(Y) | 0 | −wR | 0 | +qVB |

As is apparent from the above chart, in respect to the negative end, at quadrant location I, the B field is 0 and the voltage in the z direction is 0 and the velocity in the x direction is equal to (+WR). Thus, applying the equation (2) to the above values, the force in the x direction and the z direction are both 0.

At quadrant location II, the B field is at a maximum negative designated as −MAX(Y), the velocity in the z direction is equal to +wR and the velocity in the x direction Vx is equal to 0. Applying the force equation, a force equal to a +qVB is produced causing the dipole to be forced to the right.

At quadrant location III, the same conditions exist as in quadrant I and the force is equal to 0, as both fields reverse direction.

At quadrant IV, the B is equal to a +MAX(Y), Vz is equal to −wR and Vx is equal to 0. Thus, the force in the x direction is also equal to a +qVB.

For the positive end of the dipole, the sign of charge is now positive, but its velocity is also reversed, since by Newton's third law, it moves opposite the direction of the negative end. Thus, the net force along the X-axis is the same.

The same analysis would apply to the second dipole, being noted that the second dipole is shown rotating in an opposite direction but the Z velocity components are the same for each charge. The dipole rotation can be commenced in either direction based upon the probability of the location of the electron at the time of the application of the electric field thereto.

The electric forces (E) for the negative charge on each dipole vary as a cosine function yielding a velocity which is its integral or sine function. Thus, the net force is vector sum of the forces on the negative and positive charges:

$$F = +q \, (V \sin wt) \, (B \sin Wt) + (-q) \, (V \sin wt + \pi) \, (B \sin wt) \tag{3}$$

$$= 2q \, w \, RB \sin^2 wt.$$

Since 2qR is the dipole movement (p=qs), the net force on each dipole is shown in equation (3):

$$F = p \, B \, w \, \sin^2 wt. \tag{4}$$

The average force is found by integrating equation (4) over a complete cycle and dividing by (2π):

$$F = \tfrac{1}{2} \, pBW. \tag{5}$$

For purposes of this invention, the term "particle" is intended to cover an atom of matter, a molecule of matter or a colloid of matter which can be defined as an aggregate of molecules stuck together. As an example, consider the case where the particle is water. A water molecule $H_2O$ has the permanent dipole movement equal to 1.85 Debyes (a Debye is equal to $3.3 \times 10^{-30}$ Coul-meter) due to the assymetry of the hydrogen bonds with the respect to the oxygen atom. In addition, an induced dipole movement $P_i$ can be created when an electric field is applied given by the following equation:

$$P_i = \epsilon_0 \alpha E \qquad (6)$$

where
$\epsilon_0$ is the permittivity constant; and
$\alpha$ is the polarizability (m$^3$).

Polarizability has the dimensions of volume, and a value that approximately corresponds to the actual volume of the atom or molecule. The volume of a molecule can be increased significantly (and hence its polarizability) by exciting the particles' outer electrons to high energy levels. The radius of a quantum orbit in a simple Bohr atom increases with the square of the principal quantum number (n). Hence, the polarizability increases as the volume by the following equation (40):

$$\alpha = 4/3 \, \pi \, n^6 \, R_0^3 \qquad (7)$$

In order to aid the explanation of the polarization of an atom, the subject shall be treated in a classical manner and should be based upon a reference to a simple Bohr atom (hydrogen) with a single proton at the core. The electron is assumed to have been excited to a higher energy state, and is in orbit about the nucleus as shown in FIG. 3. An energy level diagram thereof is shown in FIG. 4 and will now be described in detail.

FIG. 3a is a graph showing the orbit traversed by an electron 128 of a hydrogen atom having a proton 130. The atom is in a highly excited state. The electron (128) traverses a path shown by arrows 132 and the distance between the electron 128 and the proton 130 is shown by "r." The shortest distance between the electron 128 and the proton 130 is shown by "$r_p$," the lowest orbit point being the perihelion. The greatest distance between the electron 128 and the proton 130 is shown as "$r_a$" (the highest orbit point being the aphelion).

For large (n), the Rydberg electron moves in a nearly hydrogenic orbital around a core which consists of an atomic ion. This illustration shows a classical Bohr orbit. In reality, the electron is viewed as a cloud of charge. Hence, the charge in any region is equal to the volume of that region times the charge density. The average charge density is proportional to the time the electron spends in that region of its orbit. The faster the electron moves through a region, the less time it spends in that region and, therefore, the less average charge in that region. Classically, the charge density varies inversely as the speed of the electron. In FIG. 3a, as the electron moves further from the nucleus, the slower its speed, and hence a larger concentration of charge at a distance from the core. Hence, the Rydberg atom has an electric dipole moment, particularly when an external electric field is applied to the particle. In the simplest view, this moment is equal to the product of electron's charge times the distance from the ion core:

$$p = e \, n^2 R_o \qquad (8)$$

where $R_o$ is the ground state radius of the electron. For $n = 20$, in the case mentioned earlier, $p = 1.6 \times 10^{-19}$ (400) $(10^{-10}) = 6.4 \times 10^{-27}$, coul-meters, more than 1939 Debyes, 1048 times larger than $H_2O$! The dipole moment-to-mass ratio for a simple excited hydrogen atom is thus nearly equal to unity (one). Hence for a magnetic field of $\frac{1}{2}$ Tesla, the acceleration corresponds to the value of the frequency, i.e., $10^6 \text{m/s}^2$ at one megacycle, etc. However, the induced electric field may be sufficient to ionize the atom as the atom or molecule is excited to higher and higher energy levels, it becomes more easily ionized. The ionization potential decreases inversely with the square of the principle quantum number:

$$U = U_i/n^2$$

The application of an external electric field E and magnetic field B distorts the path traversed by the electron 128 and pulls the electron to one side of the proton 130. The effect of the external electric field E is to apply a moment onto the dipole in accordance with Equation (6).

FIG. 3b is a graph showing the charge density of the atom of hydrogen illustrated in FIG. 3a as a function of the distance of the electron 128 from the proton 130 in Bohr radii ($R_o$). As shown in FIG. 3b, when the electron is at distance "$r_p$" the charge density is high due to the close proximity of the electron 128 to proton 130, even though the dwell time is short the charge density decreases as the distance "r" increases until the distance "$r_a$" is reached. At that point, the electron essentially reverses direction and the variance in speed results in a momentary increase in charge density.

As noted in Equation (8), the dipole moment p increases as the square of the dipoles energy level "n," wherein "n" is the quantum number of the energy level.

FIG. 4 is a graph of the effect of exciting hydrogen gas to various quantum levels "n" plotted as a function of electron volts (eV). The energy level of the hydrogen gas can be increased by means of a laser source or other energy source which is capable of raising the excitation level to a high quantum level. The Bohr radii increases as a square of the quantum number "n." For example, if $n = 2$, the radius is four (4) times larger. The volume of the atom increases as a function of $r^3$, or N to the sixth (6th) power.

Thus from a theoretical aspect, one significant and important part of this invention is the increased operating efficiency and increased thrust that is obtained by exciting the atoms of the gaseous material to a high level of electronic excitation (sometimes referred to as a Rydberg atom). The relationship between the acceleration of dipolar particles in both a ground state and in an excited state and the effect thereof on the dipolar force field propulsion system can now be assessed. The ideal operational conditions of an inductive dipolar force field propulsion system can be developed as follows:

The particle acceleration has been derived earlier [equation (5)]:

$$\ddot{X} = \frac{1}{2} \, \frac{P_e}{M_o} \, (BW) \qquad (9)$$

The dipole moment ($P_e$) is that induced due to an applied electric field (E), to an excited atom:

$$P_e = \epsilon_0 K_1 n^6 R_o^3 E \qquad (10)$$

where ($n^6 R_o^3$) is the polarizability in cubic meters, incorporating the recent evidence that the polarizability scales as $n^7$ for excited atoms. Here $R_o$ is the Rydberg electron orbit radius for the ground state (n=1 for light elements), and $K_1$ is a correction factor of the actual ground state polarizability versus the actual atomic volume. If the electric field is too high, field ionization of the atom will occur; this limiting field ($E_f$) is given by the Coulomb equation:

$$E_f = \frac{ZKe}{R^2} \tag{11}$$

where (R) is the electron orbit radius, equal to:

$$R = n^2 R_o \tag{12}$$

and (Z) is the atomic number, and K has the value $9 \times 10^9$.

For any simple atom, the number of protons equals the number of neutrons in the nucleus, and thus the atomic mass is approximately:

$$m_o = 2Z\, M_p \tag{13}$$

where ($M_p$) is the proton rest mass. The maximum dipole moment-to-mass ratio is thus (combining equations (10), (11), (12) and (13):

$$\Omega = \frac{P_e}{M_o} = \frac{\epsilon_o K K_1 n^3 R_o e}{2 M_p} \tag{14}$$

Note that (r) is apparently independent of (Z). We can evaluate this result by letting:

$\epsilon_o = 8.85 \times 10^{-12}$ $K = 9 \times 10^9$ $K_1 = 1$ $R_o = 0.5 \times 10^{-10}$ M $M_p = 1.67 \times 10^{-27}$ kg $e = 1.6 \times 10^{-19}$ Coul The result is:

$$r = 2 \times 10^{-4} n^3 \tag{15}$$

Consider the following examples:
For:

n=17, r=1 n=36, r=10 n=79, r=100

In order to obtain high Rydberg states (n>10), the gas should be cooled to reduce the chances of collisional quenching:

$$\frac{3/2\, KT}{\text{(molecular energy)}} < \frac{U_i/n^2}{\text{(ionization energy)}}$$

where ($U_i$) is the ground state ionization potential, and here (k) is Boltzman's constant and (T) is the temperature in degrees Kelvin. High n's are possible in thruster applications where selected propellants are utilized. A cryogenic gas such as, for example, the boil-off of liquid helium at about 5° K. may be used, thus a possible maximum (n) value is:

$$n_{max} = \left( \frac{U_i}{\frac{3}{2} kT} \right)^{\frac{1}{2}} = 141$$

In an inductive dipolar accelerator, described later in reference to FIG. 36, the acceleration is given by:

$$\ddot{x} = \frac{\epsilon_o \alpha}{2 M_o} R_c (BW)^2 \tag{16}$$

where $R_c$ = the coil radius or field gap used in the magnet. We can calculate the limiting B-field frequency product before ionization is induced:

$$BwR_c < \frac{ZkI}{R^2} \tag{17}$$

$$\therefore Bw \cong \frac{ZkI^2}{R_c R^2} \quad \text{(Limiting Field-Frequency)}$$

Combining equations (16) and (17):

$$\ddot{x}_{max} = \frac{\epsilon_o K_1 K^2 Z e^2}{4 M_p R_c n R_o}$$

Evaluating this with $k_1 = 1$, and assuming $R_c = 1$ cm, we obtain:

$$\ddot{x}_{max} = \frac{10^{10}}{n} \text{ M/sec}^2 \tag{18}$$

For n=100, the acceleration is $X = 10^9$ m/s², comparable to conventional electric and plasma thrusters. This is achieved at a field-frequency product of:

$$Bv = \ddot{X}/2\pi r = 0.8 \text{ MHz-T} \tag{19}$$

Thus, assuming we can have high Rydbergs, at a magnetic field-frequency product of less than 1 MHz-T, the particle acceleration is comparable to conventional thrusters. The lifetime ($\tau_e$) of the excited Rydberg atom is greatly increased at large values of n, in fact it scales as:

$$\tau_e \sim n^3 \tag{20}$$

(neglecting collisions and field effects). Hence, the lifetime can be long enough to be accelerated over the channel distance before deactivation:

$$\tau_e > L/V_g \tag{21}$$

where (L) is channel length and ($V_g$) is gas velocity. The Lorentz forces exerted on the excited Rydberg electron by the external B-field becomes comparable to the Coulomb forces holding the electron captive to the nucleus:

$$qVXB \cong \frac{ZKe^2}{R^2} \tag{22}$$

This can be made into a squeezing force to be used to minimize the chances of ionization at the cyclotron frequency ($w_c = eB/M_e$). Operation at lower pressures would also be desireable to reduce again the effects of collision frequency and increase the mean free path comparable to the size of the accelerator channel. In any event, any collisions that do take place should satisfy the following condition:

$$3/2 KT \neq n(v_n - v_{n-1}) \tag{23}$$

That is, the collision energy should not correspond to any transition of either particle (vibrational, rotational or electronic). Finally, the conductivity (6) of the gas (degree of ionization) must be not so high that the skin depth (8) gets too low and the field does not penetrate the gas:

$$\delta = \left(\frac{2}{6wM}\right)^{\frac{1}{2}} > R_c \text{ where } M = \text{permeability} \tag{23a}$$

We can thus summarize the operation (ideal) conditions of the dipolar thruster:

$$BwR_c < \frac{Zkl}{R^2} \text{ (no field ionization)} \tag{24}$$

$$\frac{3}{2} kT < \frac{U_i}{n^2} \text{ (no collision ionization)} \tag{25}$$

$$\frac{3}{2} kT \neq (V_n - V_{n-1}) \text{ (elastic collisions with no absorption)} \tag{26}$$

$$R_c < \delta = \left(\frac{2}{6wM}\right)^{\frac{1}{2}} \text{ (size of channel less than skin depth)} \tag{27}$$

$$P_{dis} = \frac{P_{c1}h}{Q} \text{ (electric power discipation is low per unit of thrust)} \tag{28}$$

$$\tau e > \frac{L}{V_g} \text{ (lifetime of Rydberg long enough to accelarated)} \tag{29}$$

Finally, with respect to equation (28), high "Q" circuits are required to reduce electrical losses, which increase the selectivity or narrows the bandwidth of the circuit.

These conditions, as mentioned, may be achievable only in applications where the propellant can be optimumly selected. In other areas, such as coupling with the atmospheric gases, the properties are dictated by the ambient temperature and pressure conditions. This will be more fully appreciated as the following embodiments are described.

NATURE OF EXCITED STATES

A general discussion of excited states in particles such as atoms and molecules and their electric dipolar properties is deemed essential for proper understanding of the present invention. The physical description of the invention has been viewed in a strictly classical manner, i.e., the quantum mechanical aspects of the propulsion concept have not been directly considered. The May, 1981 issue of *Scientific American* contained an article entitled "Highly Excited Atoms" providing a review of excited levels of atoms. An atom or a molecule can be excited by the absorption of a quanta of energy equal to its first transition energy level, around 10 ev. The method of excitation can be from a source of ultraviolet radiation as from a lamp or laser having a photon energy equal to Planck's constant (h) times the frequency, or by the impact of an ion or electron having a translational kinetic energy of approximately 10 ev. A review of electron impact excitation can be found in National Bureau of Standards report NSRDS-NBS 25, dated August, 1968, entitled "Electron Impact Excitation of Atoms." Photons offer the advantage of narrow energy spread and resonant excitation. Electron impact generally gives much less selectivity but creates a more intense population of excited states. In electron impact excitation, intense electron beams or discharges can be obtained and electron impact cross sections tend to be larger than photon cross sections. Both techniques are invisioned as being utilizable with the present invention, depending on the application, one technique may be preferred over another.

Excitation of an isolated molecule may lead to ionization, autoionization, dissociation, predissociation, or reradiation of the excitation energy. Each of the energy excitation processes, can in principle, occur and compete with each other. However, since the rates may differ by many orders of magnitude, usually one process dominates the excitation process. The primary mechanism is currently viewed as being dissociation, especially of oxygen in the air which has the lowest dissociation energy of around 5 ev., nearly half that of nitrogen. At sufficiently high electron impact energies, above 25 ev., the oxygen molecule breaks into two atomic fragments, one being a high Rydberg state and the other a low metastable Rydberg ($3s^5S^o$) at 9.13 ev. Because it is the lowest quintet state, it is metastable with a radiative lifetime of about one millisecond. Rydberg states that have atoms of large principle quantum numbers (n), although not metastable by any selection rules, have long enough lifetimes to be observed in the laboratory. The energy required to remove an electron from a simple atom is given by:

$$E = 13.6/n^2 \text{ eV} \tag{30}$$

The mean value of the orbital radius is $$r = 0.26(3n^2 - a(1+1)) \, A^o \tag{31}$$

where 1 is the orbital angular momentum integer. For an s electron with n=20, this radius is 156 $A^o$; this radius is huge. The radiative lifetime of a Rydberg state is proportional to $n^3$ and can therefore reach values between 10 to 100 microseconds for a state with n=20, but with an ionization potential of 0.034 eV, it is readily ionized by ambient thermal collisions. Hence, an n value this high represents an upper limit for the present invention which seeks acceleration of an unionized atmospheric gases.

The atoms of a diatomic molecule can rotate about the molecule's center of mass and vibrate along the interatomic axis. The energies of both molecular rotation and of vibration are quantized, and this leads to distinctive molecular rotational and vibrational spectra. The present invention is only concerned with rotation since these represent lower frequencies (RF) whereas vibrational energies usually lie in the infrared. The angular momentum L associated with the molecular rotation of a diatomic molecule is quantized according to the rule:

$$L = J(J+1) \, h \tag{32}$$

where J is the rotational momentum, (I) quantum number with possible values 0, 1, 2, ... n−1. This quantization implies that the energy of molecular rotation is quantized, and the respective absorption frequency is given by:

$$f = J(J+1)h/2I \tag{33}$$

where (I) is the moment of inertia of the molecule. The moment of inertia is given by:

$$I = m_o n^4 r_o^2 \tag{34}$$

where $r_o$ is the separation distance between the two nuclei of the diatomic molecule. Transitions between the quantized molecular rotational energy states of a polar molecule gives rise to the molecule's pure rotational spectrum. The selection rule governing allowed transitions is $J = +-1$. The rotational spectrum consists of equally spaced lines typically found in the far infrared and microwave regions of the electromagnetic spectrum for ground states. For excited states, the moment of inertia increases as $n^4$ and the rotation frequencies may be lowered to radio frequencies. Thus, it is clear that the rotation of water vapor molecules which are polar, to create thrust in the atmosphere in a high frequency Lorentz field, is quantized and selected frequencies are most effective for resonant absorption of energy.

It is also possible to have "superexcited molecules," that is, there is high probability of a molecule receiving energy in excess of its lowest ionization potential without immediate ejection an electron, as such, superexcited molecules form electrically neutral excited molecules possessing energy greater than the ionization potential. Such a superexcited molecule, may, like molecules excited to states below the ionization potential, undergo dissociation to form smaller fragments, one or both of which may be electronically excited.

An electronically excited molecule is thermodynamically unstable, and can lose energy rapidly by several competitive pathways. The actual lifetime of a superexcited molecule depends on its nature, on the complexity of the molecule, and the possible alternative degradation processes. The magnitude of such lifetimes are generally in the very wide range from $10^{10}$ to $10^{-3}$ second. One such process is molecular dissociation of the excited state leading to the formation of atoms or smaller molecules, which, in turn, may be excited. In contrast, the most likely processes leading to energy degradation without reaction are radiation conversion (fluorescence), or nonradiative conversion (internal conversion) to the ground state. The latter is generally less probable than internal conversion to the lowest excited state followed by fluorescence to the ground state. Internal conversion is a rapid process ($10^{-10}$ sec), and may include intersystem crossing which involves a change of multiplicity, i.e., transition from a low lying singlet state to a lower lying triplet excited state. Triplet states are potentially very important in the present invention since light emission with a change of multiplicity (phosphoresence) is a slow process ($>10^{-4}$ sec), and the electronic energy is available for comparatively long times to provide longer periods of acceleration. Triplet states may also be formed by direct excitation by slow electrons and in the recombination reaction of a positive ion and electron.

It is clear that fluorescent energy emitted by one molecule could be absorbed by another. However, energy transfer can also occur from excited molecules by a nonradiative resonance process. This is formally equivalent to the emission of a photon by the excited molecule and its absorption by another molecule whose absorption spectrum overlaps the emission spectrum of the emissive molecule. This process is not restricted to situations involving collisions between molecules, but can occur when the distance separating the molecules is less than the wavelength of the emitted photon and can take place efficiently over distances of 50–100 A°.

In the case of collisions between neighboring particles, a pressure dependence of the excitation process involves the following major factors: (1) imprisonment of resonance radiation; and (2) collision transfer of excitation. Reabsorption of photons by atoms in the ground state effectively lengthens the life of the excited state, and spreads the excited state population over a larger volume. The longer effective lifetime of the upper state results in an increased probability for intervention of collisional processes, and for conversion through radiative transitions to lower levels other than the ground state. In collisional transfer, an excited atom is de-excited in a collision with a ground state atom with a transfer of excitation energy and possibly changes in the values of angular momentum and spin associated with the excitation energy. With the addition of gases of different species, "optical pumping" may occur in which the foreign atoms act as buffer atoms such that collisions between the excited atom and the buffer atom will not undo the excited state but because of the shapes of the electron orbits of the two particles, the buffer atoms prevent the magnetic interaction of their electrons. It is by this process that a population of excited or pumped atoms leak back to an unpumped, low ground state. The existence of such processes serves to diminish the excitation power required to accelerate a given amount of gas. The creation of a "population inversion" state is obtained. Thus, laser action may be used for practicing the present invention.

A discussion of an excited state of a single atom versus the ionization state energy will now be considered. The energy required to excite an atom to a given P.Q.N. is given by:

$$U_e = U_i \left(1 - \frac{1}{n^2}\right) \tag{35}$$

Where $U_i$ is the ground state ionization potential. The ratio of the maximum possible dipole moment-to-mass ratio (52) per unit of excitation energy is as follows:

$$\frac{\Omega}{U_e} = \frac{C_1 n^3}{(1 - 1/n^3)} \tag{36}$$

For large values of (n), this ratio increases as a function of $n^3$. Hence, it appears that the most effective use of the excitation energy occurs at the highest possible (n) value, and just below the threshold of ionization. The absorption frequency, however, becomes smaller as higher states of (n) are reached as shown as follows:

$$\nu = CR\left(\frac{1}{n_l^2} - \frac{1}{n_u^2}\right) \tag{37}$$

where:
$n^u$ = upper Principal Quantum Number
c = velocity of light
$n_l$ = lower R=Rydberg Constant At values of (n) greater than about 40, the electronic absorption frequency lies in the microwave region, compared to the ultraviolet region at near ground state values of (n).

In typical laboratory experiments with excited states, high values of (n) are achieved by using a gas laser and a tunable dye laser which provides some control over the frequency range. Thus, the process can be controlled from the ultraviolet to the microwave frequencies. Experiments in the laboratory have been performed with molecular beams of sodium in a high vacuum. A magnetic field is used to extract any ions that are present after excitation. The levels of excitation are then measured by applying a known field ionization voltage between a set of electrodes around the beam. The cutoff voltage will ionize all particles of a specific (n) and higher, providing an ionization current, whose magnitude determines the population of these excited states. Electron impact as well as laser excitation have been used. A discussion of the former, with reference to atmospheric oxygen, can be found in the *Journal of Chemical Physics*, page 3125 by R. Freund, Apr. 1, 1971.

MECHANISMS OF DIPOLAR COUPLING

There are at least five different basic methods of creating dipolar type interactions with an external Lorentz field. These various mechanisms are briefly reviewed as follows:

(a) Electronic dipole—at any instant of time, an electron in its orbit about the nucleus constitutes a dipole, and, as the electron orbits, the system can be viewed as a dipole rotating at the orbital frequency of the electron about the nucleus. This frequency is given by:

$$f = (\tfrac{1}{2}\pi) [ke^2/mn^6 r_o^3]^{\tfrac{1}{2}} \tag{38}$$

Hence, for excited states the frequency decreases inversely as the cube of the principle quantum number. For ground states, this frequency lies in the ultraviolet region, and for excited states, the frequencies involved lie well into the microwave region.

(b) Precessing Atomic Orbital Dipoles—The velocity of the electron reaches a low at the perhilion of its electrically stressed orbit which is the region of high space charge concentration. Hence, the flip-flopping of this orbit results in an oscillating dipole that establishes the polarization current density. To create this condition using atmospheric gases, the diatomic molecules must first be dissociated. The dipole moment is the major axis of the elliptical orbit from the more massive ion core to the electron at the perhilion, times the electronic charge.

(c) Precessing Molecular Orbital Dipoles—Here, the particle remains a molecule and the energy of dissociation is avoided. The molecule is excited, and the orbital perhilion is established by the alternating electric field. The dipole motion readily follows the applied electric field. This, together with method (b) represents the most common methods of dipolar coupling for atmospheric gases.

(d) Permanent Assymetric Dipolar Molecules—Some molecules, such as water ($H_2O$), possess a permanent dipole moment (1.85 Debyes) due to the assymetry of the covalent chemical bonds between the constituent atoms. Other common dipoles of this type are $NH_3$. The rotation of these molecules is quantized, but clearly no energy of excitation is required to attain moderate dipole moments.

(e) Heteropolar Molecules—Some molecules which have ionic bonds, possess permanent electric dipole moments. For example, sodium chloride NaC1, has a dissociation energy of 4.24 eV, and an equilibrium separation distance of 2.36 A$^o$. Since the molecule is held together by ionic binding, the end containing the Na nucleus represents a region of positive electric charge. The end containing the C1 nucleus represents a region of negative charge. Hence, it has a dipole moment of 9.0 Debyes, more than four times larger than the water molecule. Such molecules, while not existing in the atmosphere, could be used in more conventional thruster applications.

Before proceeding with a further discussion of the dipolar force field propulsion system, certain of the well known matter particles which may be useful as a source of neutral particles of matter having selected electric dipole moment or polarizability characteristics with known breakdown characteristics for practicing this invention are set forth hereinbelow. The below list are examples of possible ground state propellants for the dipolar force field propulsion system.

TABLE 2

PROPERTIES OF DIPOLAR SUBSTANCES IN GROUND STATE

| Specie | Molecular Weight | Permanent Dipole Moment (D)* | Polarizability (A$^3$) | Ionization Potential (eV) | Dissassociation Energy (eV) | Boiling Point (°K.) |
|---|---|---|---|---|---|---|
| Helium (He) | 4 | — | 2.5 | 24.48 | — | 4.95 |
| Water ($H_2O$) | 18 | 1.85 | 18.6 | 12.6 | 2.5 | |
| Sodium (Na) | 23 | | | 5.138 | — | |
| Ammonia ($NH_3$) | 17 | 1.47 | 27.8 | | | 239.8 |
| Lithium Floride (LiF) | 26 | 6.33 | | | | |
| Nitrogen ($N_2$) | 28 | — | 22.1 | 15.576 | 9.75 | 77.35 |
| Oxygen ($O_2$) | 32 | 2 B.M.** | | 12.063 | 5.0 | 90.18 |
| Hydrogen Cloride (HCl) | 36.45 | 1.08 | | | | |
| Salt (NaCl) | 58.45 | 9.00 | | | 4.24 | |
| Xenon (Xe) | 131.30 | — | 27.3 | 12.127 | — | 166.05 |

*D = Debye = 3.3 × 10$^{-30}$ Coul-meter
**B.M. = Bohr Magnetron

FIG. 5 is a graph showing the polarizability and ionization potential versus the energy level of the atom. However, the field ionization limit of the particle cannot be exceeded, otherwise, ionization will occur, which is undesirable. The ionization potential decreases rapidly as the P.Q.N. increases. Also shown is the electronic absorption frequencies as the P.Q.N. is increased.

The thermal energy of ambient gas molecules is of the order 0.04 eV, hence P.Q.N. of up to 15 to 20 are possible without causing ionization of the excited atom. It is evident that polarizabilities up to $10-24m^3$ may be possible at ambient temperatures. Quantatively, the following condition must be satisfied:

$$E_f \cong BR_c w < \frac{Ke^2}{R^2} \quad (39)$$

where R is the coil radius.

The coulomb electric field experienced by the electron in its orbit equals the induced electric field at a distance $R_c$ from the coil. In other words, the orbital radius of the Rydberg electron is restricted to the value indicated to prevent ionization of the atom. For the condition just mentioned, (n=20, B=½ Tesla and R=½ meter), the P.Q.N. is limited to 17; hence the Rydberg atom will not ionize for P.Q.N.'s equal to or less than this value. Combining equation (30) with (28) and (24) and solving for the maximum possible atmospheric acceleration "ẍ," for a given n. $R_c$ and molecular weight, we obtain:

$$\ddot{x}_{atmos} = \frac{2.2 \times 10^7}{R_c} \text{ M/sec}^2 \quad (40)$$

where $R_c$ is the radius from the center of the coil to the point of interest. This equation gives the approximate limit in particle acceleration that is possible without causing ionization to take place in the atmosphere. The equation further implies that for larger and larger diameter field coils, it is desirable to have lower excited states in order to avoid ionization.

FIG. 6 is a graph showing the possible particle acceleration attainable as a function of the product of the magnetic field and the applied frequency which must be less than the field ionization potential limit. The field ionization limit is not a specific boundary layer condition, but is a range where ionization occurs and is dependent on a number of variables including the strength of the magnetic field, frequency and properties of the dielectric substance. The graph of FIG. 6 is based upon the use of nitrogen (N2), the primary constituent of air for various principle quantum numbers. Also, shown is the acceleration of water vapor molecules which are assumed to remain in a ground state. From the graph in FIG. 6, particle accelerations of $10^6$ to $10^6$ m/s$^2$ may be possible. These types of accelerations are typical of the gas accelerations found in rocket and jet engine thrust chambers. Hence, this invention has utility in propulsion applications.

LINEAR DIPOLE FIELD ACCELERATOR

Referring now to FIG. 7, a simple LCR circuit is shown consisting of an electrode pair 140 and 142 having a capacitance C and which contains a polarizable gas 160 therebetween as a dielectric. The capacitor C defined by the electrode pairs 140 and 142 and the polarizable gas 160 as a dielectric is series connected to an inductance coil 146 having an inductance L. The inductance coil 146 provides a crossed magnetic field which crosses and intercepts the electric field extending between the electrodes 140 and 142. The inductance coil 146 is shown in greater detail in FIG. 9. The LCR circuit illustrated in FIG. 7 provides an electric and magnetic field which vary, in time, as a cosine and sine function, respectively. The circuit has a resistance R, shown by element 150, which should be minimized to reduce joule heat losses. The circuit is supplied with electrical power from a voltage source E, shown as 152, by closing a switch 154. The gas molecules 160, which are to be accelerated, are located between electrode 140 and 142 and are excited by a vacuum ultraviolet radiation source 170 having a reflector 172. The radiation from the radiation source 170 is shown by arrow 174 which is directed into the gas molecules 160. The gas molecules 160, when in a ground state, normally have a relative dielectric constant ($K_r$) near unity. However, when the gas is excited, the dielectric constant, and hence the capacitance, increases significantly as given by the following equation:

$$P = (K_R - 1)\epsilon_o E \quad (41)$$

where $P = \bar{p}N$, the polarization or average dipole moment per unit volume

For gases excited to PQN=10, the dielectric constant is near 10,000, at 10 KV/M field strength. Therefore, even with small electrodes, significant electrical energy can be stored in the excited gases. In the perferred embodiment, the electrodes 140 and 142 are sized to store the energy cycled between the coil 146 and capacitor C having the excited gas as a dielectric. The entire circuit is tuned for operation at substantially the resonant frequency. This configuration establishes the requisite spatial and time force field region to generate a dipolar propulsive effect on the gas.

Referring now to FIG. 8, a linear accelerator 200 is shown using the construction and elements of the simple LCR circuit shown in FIGS. 7, 8 and 9. The linear accelerator 200 consists of a number of electroconductive plates 202 which act capacitively and are arranged to form two sides of a linear rectangular channel 206. The other two sides of the linear rectangular channel 206 are the pole faces 212 and 214 of a series of U-shaped electromagnets which are arranged along the channel length. The electromagnets have energizing coils 216 situated externally to the linear rectangular channel 206. The alternating current power source is applied to a conductor 220 across plate 202, which plates are connected in series with the windings 216 of the coils 212. The other side of the windings 216 of coil 212 is connected to conductor 222 which, in turn, is connected across the alternating current source. The windings 216 of coil 212 and the capacitive electrode 202 are electrically connected in series as shown in FIG. 10. The connector 220 and 222 are responsive to an alternating current power source to provide a crossed electric and magnetic fields across the electrodes 202 and the windings 216 which vary as a cosine and sine function, respectively. Each stage of the elements which define the linear rectangular channel 206 are connected in parallel to each other to reduce the equivalent reactance to permit high frequency (HF) operation. The circuits are driven from an external high frequency power source which is applied via a control means 250 such that the frequency of the alternating current power supply is adjusted to operate at the resonant frequency of the circuit.

The gas molecules, which is to form the dielectric gas to be accelerated, is stored in a cryogenic Dewar of gas which maintains the dielectric gas at a extremely cold temperature. The cryogenic Dewar of gas is illustrated as 252 in FIG. 10. The gas is stored in a pressurized vessel 254. The dielectric gas passes from the pressurized container 254 through a regulator 256 to a control valve 258. The control valve is operatively coupled to a "U" shaped cooling member 260 which passes along each stage of the linear accelerator and which is located under each of the windings 216 of the coils 212 to provide cooling of the magnets 212 to increase the conductivity thereof. The "U" cooling core 260 has its other end terminating in a flowmeter 262. The other side of the flowmeter 262 is adapted to feed the gas to a plenum 280 which, in turn, distributes the extremely cold dielectric gas into the linear rectangular channel 206. The flow meter 262 is utilized to control the flow of the dielectric gas into the longitudinal rectangular channel 206. Any suitable cold gas may be used, such as an inert gas which is chemically inert and, as such, avoids causing corrosion to the electrodes. Preferably, the gas pressure in the longitudinal rectangular channel 206 is as low as possible to reduce collisional quenching of the gas.

The dielectric gas located in the longitudinal rectangular chamber 206 is excited by an external excitation source such as for example a beam of vacuum ultraviolet radiation from a source such as a lasar 270. The lasar 270 is bounded at one end of the longitudinal rectangular channel 206 and is positioned with respect thereto such that the lasar beam tranverses the entire inside length of the longitudinal rectangular channel 206 so that the dielectric gas contained therein is constantly exposed to this ultraviolet (UV) radiation. The dielectric gas is excited by the UV radiation and is strongly coupled to the alternating cross field from the electromagnets 212 and accellerated as described hereinbefore. The electric field utilized in this embodiment appears across the capacitors defined by the plates 202 having the dielectric gas therebetween. The magnitude of the electric field utilized in this embodiment is determined by the voltage that appears across the capacitors defined by the plates 202 along with the dielectric gas stored therebetween.

As stated hereinabove, the dielectric gas is preferably supplied from a Dewar 252 which preserves the fluid as a cryogenic fluid (such as helium at 4.4 degree K). The dielectric gas supplied is preferably as cold as possible to reduce the collisional thermoquenching of the excited states which is controlled by the following formula:

$$3/2kt = ui/n^2 \tag{42}$$

With a cryogenic dielectric gas, the P.Q.N.s over 100 might be possible. Thus, such a dielectric gas may have a very large electric dipole moment in high particle accelerations at low field frequency products. The possible P.Q.N. is determined by the following equation:

$$P.Q.N. = \left[\frac{2U_i}{3kT}\right]^{\frac{1}{2}} \tag{43}$$

The electric field utilized inthis embodiment is that across the capacitors ("Q" times the supply voltage $V_s$) as it alternates its stored energy with the magnet coils according to:

$$\tfrac{1}{2}cu^2 = \tfrac{1}{2}Li^2$$

where: C is the capacitance
V is the voltage across electrodes
L is the coil inductance
i is the coil current
Hence, $$V = [L/C]^{\frac{1}{2}} i \text{ and } E_e = \frac{V}{d} \tag{44}$$

where $d$ = electrode gap

The induced electric field ($E_i$) due to the time varying magnetic field which has a direction at right angles to the magnetic field is not utilized. This capacitive electric field is more useful at lower frequencies when:

$$E_e >> E_i \tag{45}$$

Whereas $E_i$ is useful at higher frequencies and magnetic fields as described in other embodiments later.

FIG. 9 illustrates one embodiment of a linear dipole field accelerator which can be used for practice in the invention. The accelerator includes electrodes 312 and 314 which are adapted to establish electromotive lines of force thereacross to establish electric field as illustrated by the arrows 318. Electrode 312 is adapted to be connected via conductor 320 to an alternating electric field source. The other electrode 314 is connected via conductor 330 to windings 332 of a coil 334. The other end of the windings 332 of coil 334 terminates in a conductor 340 which is adapted to be connected across the other side of the alternating electric field source. A highly permeable magnetic conductive member, 360, (such as ferrite) generates the necessary magnetic lines of force which are shown in FIG. 9 by arrows 362. The magnetic lines of force extend in a direction which is at a predetermined angle to selected or first direction of the electromotive lines of force and the magnetic lines of force 362 cross and intercept the electromotive lines of force 318 at a predetermined location to define a spatial force field region which is located between the electrodes 212 and 214. The alternating electric source which is applied between conductors 320 and 340 generate both electromotive and magnetic lines of force as a function of the magnitude of the alternating source which varies as a function of a selected frequency. Thus, since the electroplates 312 and 314 are connected in series with the coil 334, the rate of frequency change of the alternating source will determine the frequency of the electric field applied across the electrodes 312 and 314 and the frequency of the alternating magnetic field developed by windings 332 and applied via the magnetic coupler 360 across the spatial force field region.

FIG. 10 is the schematic diagram which shows a schematic for a multistage linear dipolar field accelerator having five stages shown by stages 364 through 372, inclusive. The stages are all connected in parallel across a pair of conductors 374 and 376 which energize from a source 380. Stage 372 illustrates a capacitor 386 which is formed of electrode plates in a manner similar to that described with respect to FIG. 7 wherein the polarizable gas molecules are located between the plates of the capacitors and wherein the gas molecules has a predetermined dielectric characteristic. The inductor, shown by inductor 388, is formed of high-flux density magnetic coil.

Figure 11:
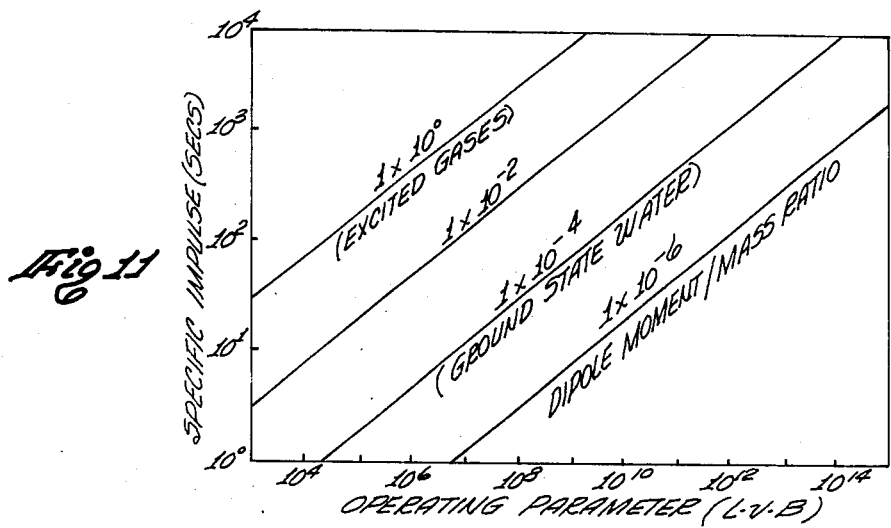
FIG. 11 is a graph of a specific impulse versus operating perimeters for various dipole moment/mass ratios.

FIG. 11 illustrates the potential specific impulses that appear to be possible, using the principles of this invention, as the operating parameter of the device. The operating parameters are the product of the channel length and the frequency and magnetic field. The graph of FIG. 11 shows the Isp for various dipole moment-to-mass ratios, such as water, and excited gases. The later can have ratios equal to or greater than unity, if the gas is properly cooled to minimize thermal quenching.

ELECTRICAL POWER REQUIREMENTS

The generation of thrust utilizing the principles disclosed in this Application requires the absorbtion of power by the dipoles in the gas. Generally, this energy absorption can be grouped into five different categories:

(1) Excitation Energy—energy in the form of a quanta of photon (hv) or electron impact energy is absorbed to create an excited state having a high polarizability or induced dipole moment.

(2) Orientational Energy—thermal molecular collisions in the gas tend to disorient the dipoles in the external applied electric field; consequently a restoring torque equal to pXE must be applied.

(3) Polarizability Energy—once the atom is excited, the electronic cloud must be stressed or distorted to create an induced dipole, with energy given by $\frac{1}{2}\alpha E^2$.

(4) Rotational Energy—finally, the dipole must be rotated by an alternating electric field, and since it has a finite moment of inertia, it has a rotational energy $\frac{1}{2} I W^2$ which must be maintained regardless of molecular collisions.

(5) Translational Energy—the kinetic energy of the particles ($\frac{1}{2} mV^2$).

In general, most of these energies are very small compared to the excitation energy required, which energy cannot exceed the ionization potential of the gas, around 14-15 ev for atmospheric gases. In addition to these energies, which are absorbed by the dipoles, there are various losses that the system will incur:

(1) Radiation Losses: Once an excited state has been accelerated and is quenched or deactivated, it will flourese or emit a photon of radiation which may be aborbed by another neighboring atom or lost to the system. If the emitted radiation excites another atom, then this improves efficiency as the energy of excitation is reused. Finally, the coil itself is a RF antenna that broadcasts radio frequency energy which can be reduced by correct design or shielding.

(2) Thermal Losses: The coil has a resistance which generates a joule heating loss ($I^2R$) which must be minimized or reduced by cooling to prevent overheating the coil. The use of cryogenic cooling or superconductivity is exploited in this respect.

Further, dielectric losses in dielectric gas are reduced. A circuit diagram of the power source and electrically coupled load was sown in FIGS. 7 and 10. In order to achieve sufficient thrust density at lower frequencies, high magnetic fields in the vicinity of 0.1 to 1 Teslas are desired. The stored magnetic field energy in the working volume times the cycle frequency represents the circulating electrical power. The actual power discipation is the circulating power divided by the circuit "Q", or figure of merit which is the ratio of inductive reactance to the resistance. The ratio of the body force to the body power discipation thus simplifies to:

$$F_b/P_{dis} = K_1 \lambda_e \omega^2 / R \tag{46}$$

Thus, for a given condition of excited gas or electric susceptability, the ratio of the frequency to resistance (Q) should be optimized. The coils shown in FIG. 10 thus consist of elements of large cross-sectional area with minimal length and are cooled to very low temperatures to minimize the resistivity. For example, in a rocket driven MHD power generator, the liquid hydrogen ($-400°$ F.) for the fuel can be circulated through the coil before combustion takes place.

The present invention has utility as a new and innovative propulsion system in which the thrust-to-power-ratio is potentially very high compared to conventional systems. The thrust-to-power ratio ($\gamma$) is given by:

$$\gamma = \frac{\dot{m} V_g}{U_e \dot{N}_e + \frac{1}{2} \dot{m} V_g^2} \tag{47}$$

where:

$\dot{m}$ is the total mass flow rate (kg/s)
$U_e$ is the excitation (photon) energy absorbed
$\dot{N}_e$ is the number flow rate of excited particles
$V_g$ is the net change in velocity of the gas If ($\beta$) equals the population fraction of excited states in the total gas flow, this equation becomes:

$$\gamma = \frac{2 v_g}{\frac{2 U_e \beta}{M_o} + V^2} \tag{48}$$

Where $M_o$ is the mass of the atom or molecule. Differenting this equation and setting equal to zero, we find the optimum velocity for maximum ($\gamma$):

$$V_{optimum} = \left[ \frac{2 U_e \beta}{m_o} \right]^{\frac{1}{2}} \tag{49}$$

As an illustrative example, assume an excitation photon energy of 10 ev and a population fraction of 1% or 0.01 using diatomic nitrogen with a mass $m_o = 28 \cdot 1.67 \times 10^{-27}$Kg, the velocity is 840 m/s and the power/thrust ratio is about 800 watts/newton. This compares to the performance of the SSME rocket engine on the space shuttle which requires 4540 watts/newton of thrust. Even better performance may be possible depending upon the number of rebounding collisions and collision cross-section of the excited atoms, which are generally much larger than ground state atoms.

Figure 12:
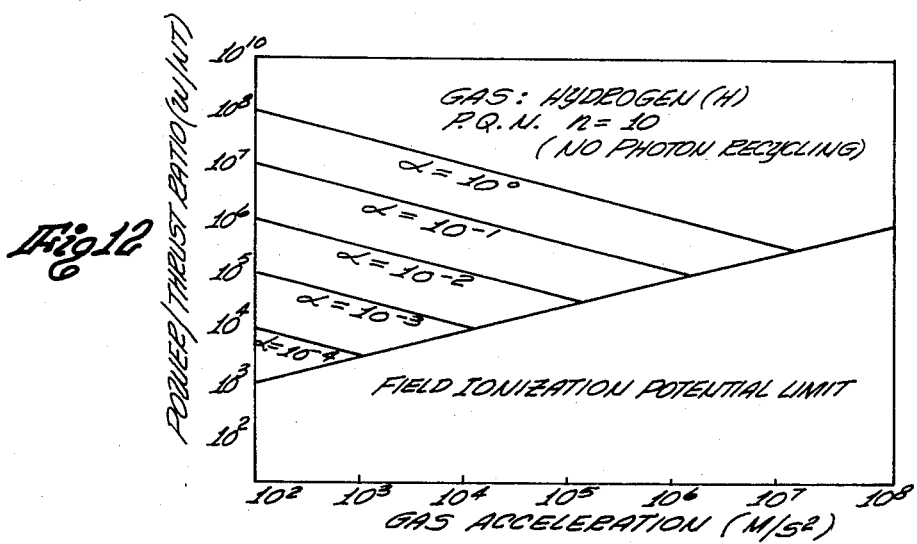
FIG. 12 is a graph of the thrust/power ratio versus velocity for the propellant in the vaporized and unionized state.

FIG. 12 is graph showing the power/thrust ratio for atomic hydrogen gas assuming no photon recycling the ratio decreases inversly with the square root of the molecular weight, thus Xenon gas would have a power thrust ratio more than 10 times smaller than hydrogen. Moreover, the ionization limit is moved further up so that higher induced electric fields are possible without field ionization. In fact, the field ionization limit ($E_i$) increases as follows:

$$E_i = \frac{ZKe}{R^2} \tag{50}$$

It increases with atomic number for an atom of given radius (R). As illustrated in connection with FIG. 7, no effort was made to capture "lost radiation." It was simply assumed that the gas completely absorbed the UV radiation as it traversed the length of the acceleration channel 306.

Figure 13:
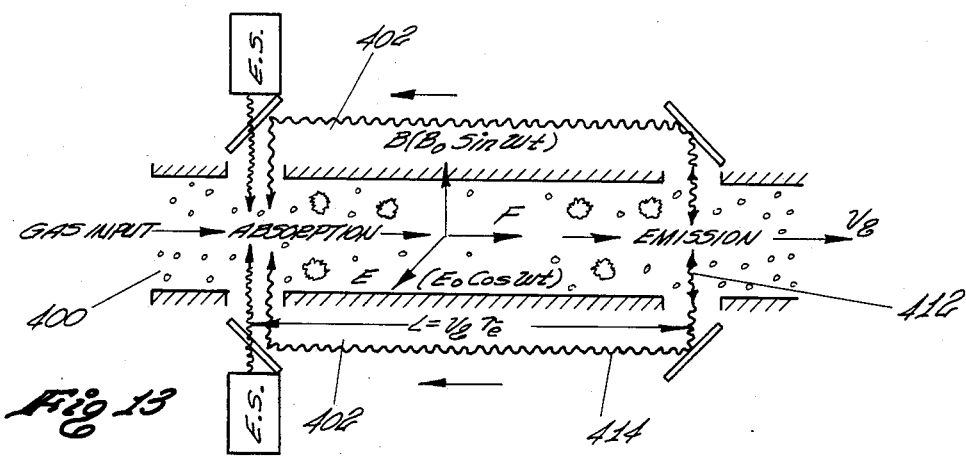
FIG. 13 is a pictoral representation of dipolar force field propulsion system having an elongated rectangular channel having a spatial force field region between plates for establishing the electromotive lines of force and wherein the magnetic lines of force of the magnetic field cross the electromotive lines of force of the electric field within the spatial force field region and wherein the vaporized gas is first passed through an excitation source which raises the electronic energy level thereof to a substantially higher level and wherein the excited atoms deactivate or decay to a ground state producing emission as the propellant passes through an outlet nozzle and the emissive radiation so generated is fed back through a mirror reflective system back to the input excitation source.

As shown in FIG. 13, the input gas 400 located between plates 402 absorbs the photons from an excitation source 406. The gas 400 is excited for a lifetime $\tau_e$ and then is de-excited. Meanwhile, the gas has traveled a length ($V_g \tau_e$), where $V_g$ is the gas velocity. The de-excitation involves the emission of a photon, with a frequency generally less than the original frequency, but still greater than that required for the first transition state above ground and thus, can be usefully "recaptured." Thus, FIG. 13 shows the emitted photon 412 being reflected (arrow 414) and returned upstream to the source gas where reaborption takes place. In practice, the input radiation may be introduced at right angles to the gas flow, and bounce repeatedly off the walls of the channel, which are approximately made into reflecting surfaces.

Figure 14:
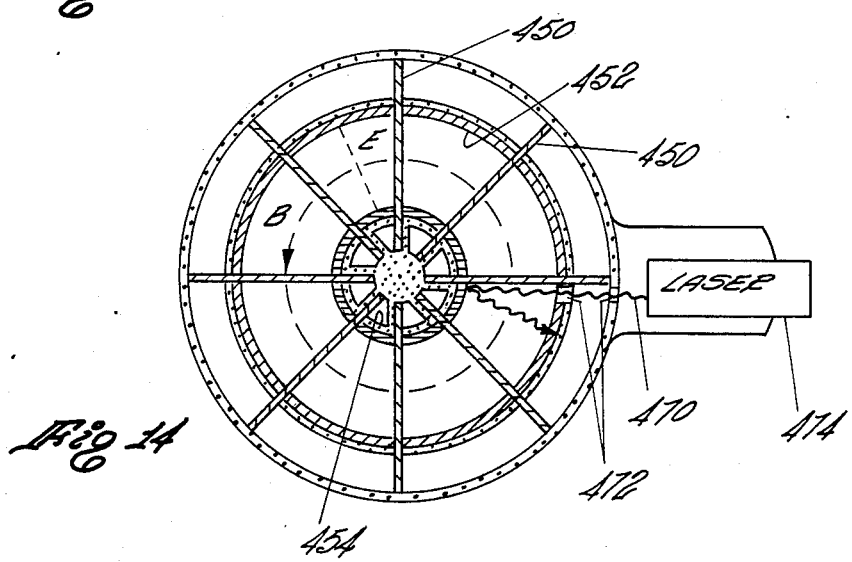
FIG. 14 is a pictoral representation, partially in sectional view, showing a high frequency torroidal dipolar force field propulsion system utilizing the teachings of this invention.
Figure 15:
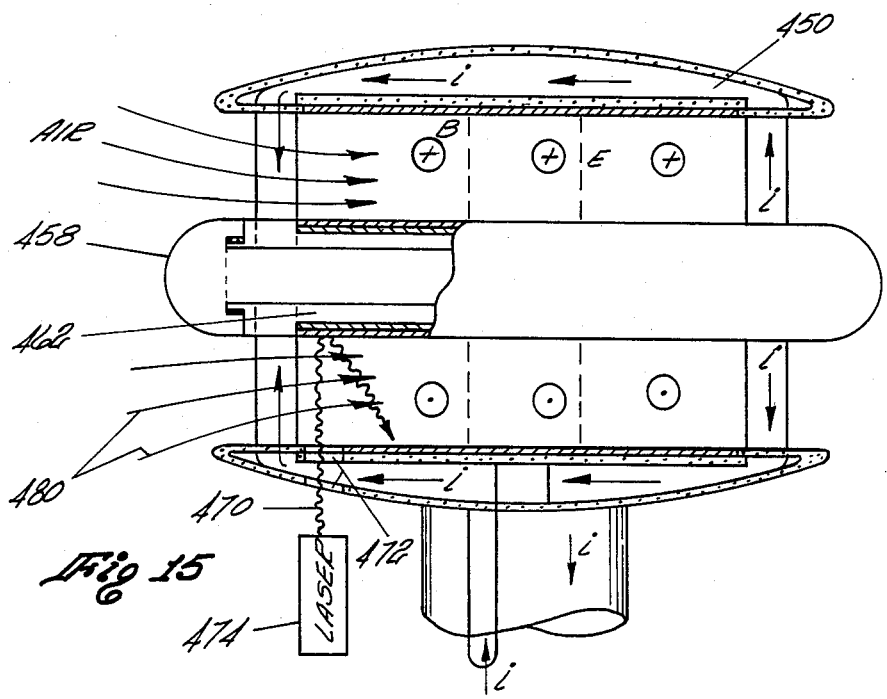
FIG. 15 is a front end view partially in cross section showing the construction of the various structural members which define a torroidal shaped spatial force field region.

In the embodiment illustrated in FIGS. 14 and 15, the feature of reflecting trapped radiation in a optical cavity is utilized. In this embodiment, a torroidal coil is used to establish the alternating magnetic field between a cylindrical capacitive electrode arrangement. The torroid coil has the advantage of having no external field (for the ideal case) and, consequently radiation losses are minimal.

Referring to FIGS. 14 and 15 therein is shown this particular embodiment consisting of flat rectangular plate conducting elements 450 arranged around a pair of cylindrical electrodes 452 and 454. The plate conducting elements 450 are insulated from the cylindrical electrodes 452 and are held to the core conductor by a collet arrangement with spindle chuck assembly 458 which locks them into position. A source of UV radiation 470 enters through holes 472 such as from an exciter laser source 474. The UV beam is tilted slightly off a radius vector to allow the beam 470 to be reflected off the inner reflective surfaces of the cylindrical electrodes which also act as an optical cavity to trap the radiation. The air or dielectric gas, shown by arrow 420, enters from the left through the conducting elements 450 and is immediately excited by the radiation and electromagnetically accelerated. As mentioned earlier, an alternate method of excitation involves electric discharges which should also be considered in this application. In this embodiment, the plate conducting element 450 are connected in series with the cylindrical electrodes 452 which define the capacitors.

METHODS OF EXCITATION

As mentioned previously, there are two basic methods of excitation involing (1) electron impact and (2) radiative or photon interaction. Each approach has its advantages and disadvantages and which one or both should be utilized depends upon the application.

Methods employing electron impact are:

Electron Beam Excitation—in this a cathode is heated in an evacuated chamber and when a voltage is applied, electrons are emitted which can be focused and directed into the gas. The beam tends to be rapidly attentuated in the atmosphere and diverges with distance due to mutual repulsion between the electrons. This technique might be used directly in propulsion applications of small dimensions, comparable to the attentuation path length.

High Voltage AC or DC Electric Discharge—this technique is perhaps the easiest to implement, can be lightweight and may provide good efficiency. Using the AC approach, the voltage may be readily stepped up to high voltages, e.g., by using a Tesla coil. The breakdown voltage causes ionization to take place, and the ions and electrons, in turn are accelerated by the field to impact ground state atoms to cause excitation. The DC approach is more complex insomuch as HV rectifiers are required, and it's not clear what is gained by doing it this way.

Radio Frequency or Microwave Discharge—in this technique, a high power microwave is applied to the gas, which, by heating the gas leads to thermal ionization and excitation. Once some ions are generated, they are further accelerated by the fields to cause more excitation and ionization. This method may not be the most efficient since thermalization and ionization may dominate the process with only incidental excitation to take place. However, if it can be made efficient, it promises to be operative over larger volumes. If done at lower megahertz frequencies, the field coil of the propulsion system itself may be used to achieve self-excitation.

Methods employing photon interactions are:

Flashtube or Flashlamp Excitation—in this technique a Xenon flashlamp is fired with a high voltage pulse which emits a spectrum of light of varied frequencies. The efficiency is low, and, moreover, there exist many frequencies not useful, i.e., that do not conform to an energy transition in the atom or molecule to be excited. Even so, the radiation can be directed, reflected in an optical cavity, and can penetrate the gas over large distances.

Laser Beam Excitation—This technique offers the advantage of a single monochromatic beam of intense, coherent electromagnetic radiation. A wide variety of types of lasers exist, e.g., water vapor lasers, nitrogen (pulsed) are rare gas excimer lasers than emit in the ultraviolet range, with photon energies that overlap the transitions in the atoms to be excited (about 10 eV), or around 1300 A wavelength. The required resonance transition levels may be 1300 A wavelength. The required resonance transition levels may be easily excited by a low pressure electrodeless discharge sustained in a microwave generator, and the resultant photons transmitted into the reaction chamber or channel through lithium floride sapphire, or calcium flouride windows. The exciting wavelengths provided by such sources include xenon (1295 A at 9.6 eV); argon (1048 A at 11.8 eV and 1067 A at 11.6 eV). When the photon energy is less than the ionization potential, the invention can function in the absence of ionization. Above the ionization potential, superexcited molecules may occur, with the added possibility of ionization. The efficiency of these lasers is generally only a few percent, but efficiencies of up to 10% for chemical lasers has been reported.

Synchrotron Radiation Sources—These utilize the acceleration of relativistic electron beams to produce radiation. The possibility of FEL's, or Free Electron Lasers may mean electron beams interacting with "wigler" magnetic fields to generate coherent radiation, may provide up to 50% efficiency.

Figure 16:
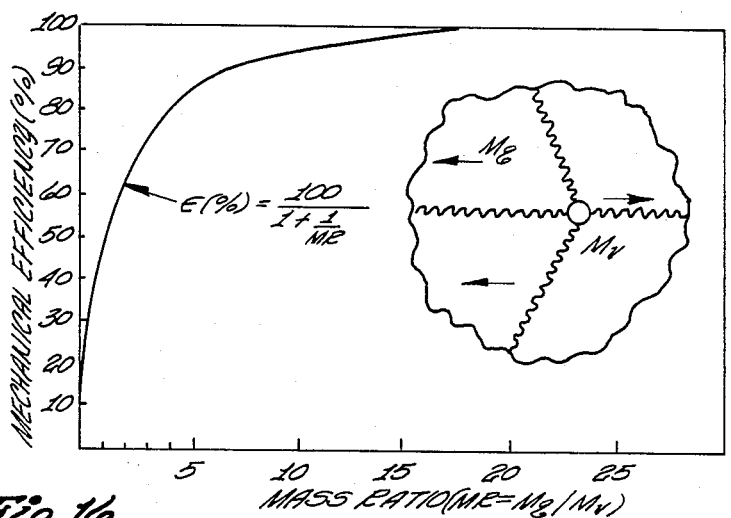
FIG. 16 is a graph representing the mechanical efficiency plotted as a function of mass ratio of the atoms utilized as the dipolar propellant matter relative to vehicle mass.

FIG. 16 illustrates the mechanical efficiency of energy conversion into vehicle kinetic energy by reacting against gas of large mass via a force field extending over space.

Figure 17:
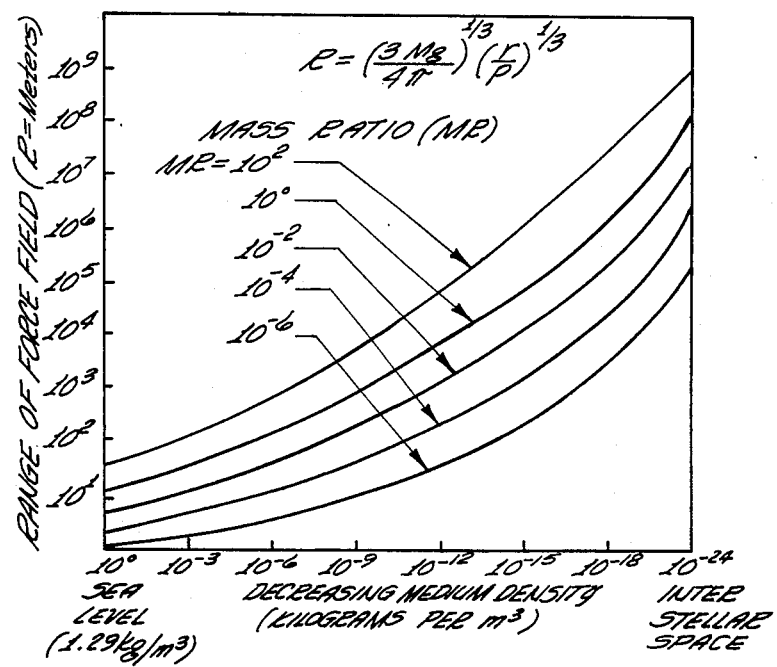
FIG. 17 is a graph of range of force field plotted as a function of decreasing medium gas density for a number of different mass ratios.

FIG. 17 illustrates the range of required force field ($R_e$) plotted as a function of decreasing medium density. As illustrated in FIG. 17, the medium density decreases, that is the density of the atmosphere from sea level to interstellar space. Thus, the range of the force field ($R_e$) increases inversely to the medium density. A family of curves are plotted for various mass ratios (M.R.).

FIG. 18 is another embodiment showing the construction of a wing structure which functions as a capacitor. The wing structure includes an exterior metal surface 500 having a plurality of cell members joined by conductors 502 which are wound in a circular pattern therearound. The center of the wing member is insulated with an insulating material shown as 504. The wings have the voltage applied thereto to generate an E field which extends perpendicular from the surface thereof illustrated by arrows 506. The magnetic lines of force illustrated by arrows 508 establish a B field which crosses with the E field as illustrated in FIG. 18.

Figure 19:
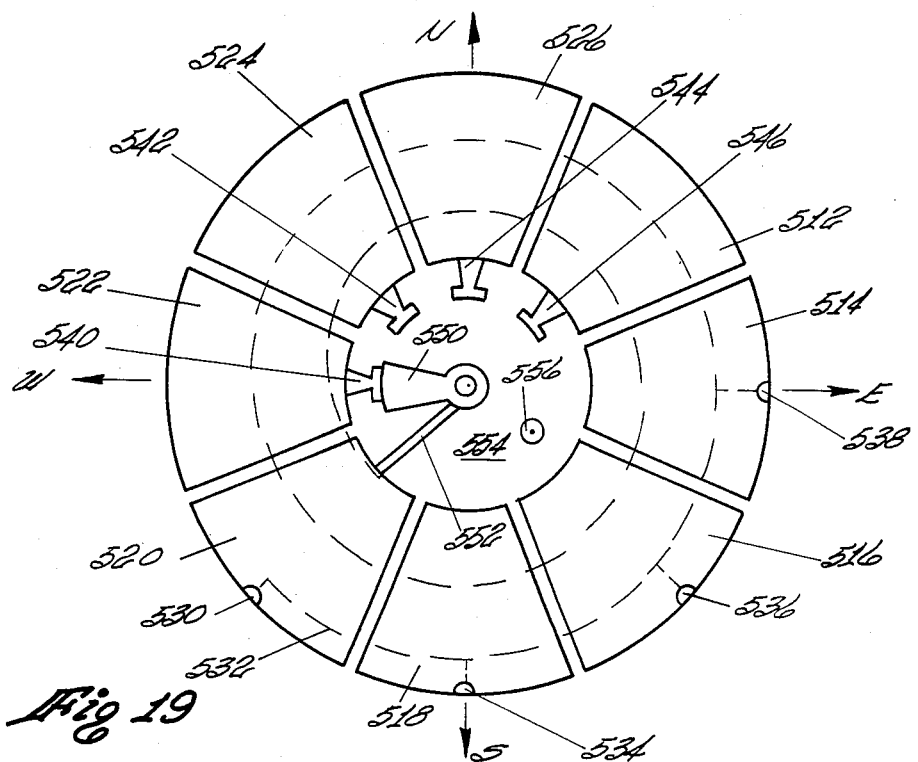
FIG. 19 is a top plan view illustrating a method of thrust directional control employing segmented electrically conductive plates and a switching mechanism for the wing construction of FIG. 18.

FIG. 19 shows the construction of the wing member illustrated in FIG. 18 in a top view. The wing is divided into a plurality of sectors designated as 512 through 526. Sector 520 has a first electrode 530 which is electrically connected to a spiral shape conductive member 532 which extends through the various sectors as illustrated by the dash line in FIG. 19. An electrode 534 that is located in sector 518 is adapted to be connected to a spiral connector 532. In a similar manner, sector 516 has electrode 536 and sector 514 has electrode 538 which is, likewise, electrically connected to the spiral conductor 532.

Also, sectors 522, 524, 526 and 512 have wiping contacts 540, 542, 544 and 546, respectively, extending from the opposite side thereof and toward the center opening defined by the sectors. The wiping contact 540, 542, 544 and 546 are adapted to be contacted by a wiping member 550 which is in turn connected via a bus connector 552 to the spiral winding 532. The wiping member 550 functions as a switch which is adapted to connect any one of the sectors 522, 524, 526 or 512 to the electrical sprial connector 532. Any one or more of the other sectors 514, 516, 518 and 520 can be electrically connected to a source by appropriate section of the electrodes 538, 536, 534 and 530, respectively. The B field is generated by appropriate magnetic means located in a central opening 554 and the B field is shown emanating from the central core 554 by means of the vector dots 556.

Figure 20:
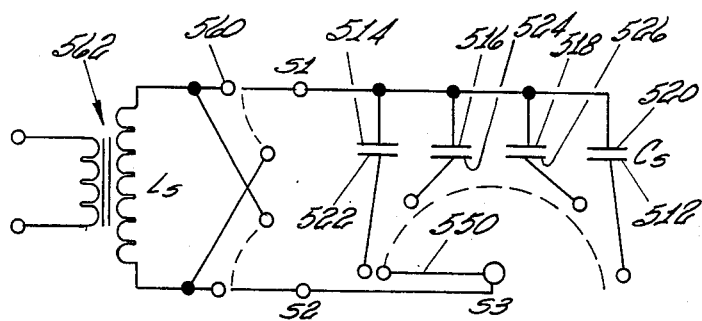
FIG. 20 is a schematic diagram of the equivalent circuit of the wing illustrated in FIG. 19.

FIG. 20 is a schematic diagram illustrating the electrical connections of the conductive and capacive elements illustrated in FIG. 19. The corresponding plates forming each side of the capacitors are illustrated by the same numbers in FIG. 20 as are pictorially represented in FIG. 19. For example, sector plates 522 and 524, which are physically located in opposite positions to each other in the sector circle, define one capacitor. The switching member 550 is illustrated as being equal to any one or more of the capacitive elements so as to control the thrust direction. By appropriate switching of the wiping number 550, the thrust can be controlled so that the spacecraft moves ahead along the arrow designated as "N" in FIG. 19, or in an alternate direction indicated by the term "NE" in "NW". In FIG. 20, a reversing switch shown as element 560 can be utilized to reverse thrust of the aerospace vehicle illustrated by FIG. 19. The alternating source and the inductor coupling means are illustrated generally as 562.

Figure 23:
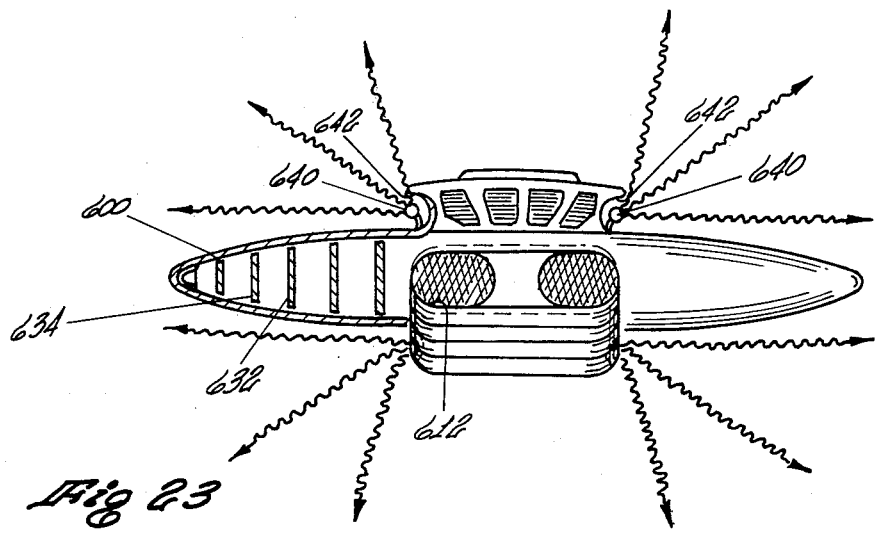
FIG. 23 is a front plan view, partially in cross section, of the discoid vehicle illustrated in FIG. 21.

FIGS. 21, 22 and 23 show an embodiment of the present invention in which a single wing disc shaped vehicle is presented. This vehicle has the feature of VTOL takeoff as well as conventional horizontal aerodynamic takeoff. The wing electrodes 600 are so contoured that they act to provide aerodynamic lift, as seen more clearly in the side view of FIG. 22. Fhe craft is powered by a rotating bed nuclear reactor 602 driven by a motor 604, which is selected to be capable of generating 1 thermal gigawatt of power in a relatively small (nearly 1 ton) device. The air, shown by arrows 610, enters the inlet 612 and is heated to about 3000° F. by the rotating nuclear bed reactor 602. The hot working gas turbine engine 616, which, in turn, drives a high frequency generator (620) via a clutch plate 622. Other methods, such as magnetohydrodymic (MHD) power generation are also possible as described with respect to FIG. 50. The high frequency generator 620 power output is inductively coupled by a transformer to a wing coil (632) via primary winding 624. The wing coil conductor elements 626 also act as airfoil shaped struts that form the rigid structure of the wing. This is to reduce weight as well as spread the force field over a larger area and couple with more gas. This is shown more clearly in FIG. 27 which shows a frontal sectional view of the vehicle. The wing conductor struts 626 are connected to a common rim bus-bar 630 that ties the coil to the wing electrodes as shown in the electrical schematic as shown in FIG. 23, formed into struts 632 separated by insulation 634 so as to reduce eddy current losses induced by the alternating field from the wing coil below the electrodes. Flashtubes 640 enclosed in reflectors 642 are provided along the fuselage or hull of the vehicle above and below the wing. As illustrated in FIG. 24a, an internal capacitor 642 is provided for internal tuning for "vertical thrust." As described earlier, other methods of excitation are possible, but flashtubes are easiest to illustrate, although low in efficiency. FIG. 23 shows a frontal view of the vehicle with air intake 612. This view more clearly shows the radiation field emanating from the flashtubes, which fall in 4–90 egree sectors or quadrants.

Figure 24B:
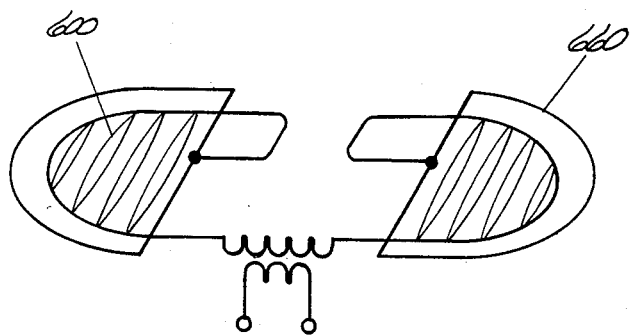
FIG. 24b is a simplified electrical schematic diagram showing the internal and external capacitive inductive elements of the discoid vehicle of FIG. 21.

Referring to FIG. 24a and 24b, simplified electrical schematic are provided. The circuit of FIG. 24a contains the wing coil inductance Lw, shown as 650 and two capacitance electrodes, one internal to the vehicle $C_i$, shown as 630 and the other the exterior wing electrode capacitance, $C_e$, shown as 652. A switch 654 is provided to permit tuning the coil 650 by either one of these capacitors. If the wing electrode pair A and B is switched in, the exterior electric field produced interacts with the magnetic field to generate a horizontal thrust component. Whereas, if only the internal capacitor 652 is switched in, the induced electric field from the time varying magnetic field of the coil generates a vertical thrust component. If the relative two capacitors can be intermediately contacted in a manner familiar to those skilled in the art, any thrust component intermediate to the horizontal and vertical can be generated for directional control as required.

FIG. 24b is a schematic diagram of the coils (660) forming the inductor on wing electrode 600 shown in FIG. 24a for generating the magnetic field for the spacecraft.

Figure 25:
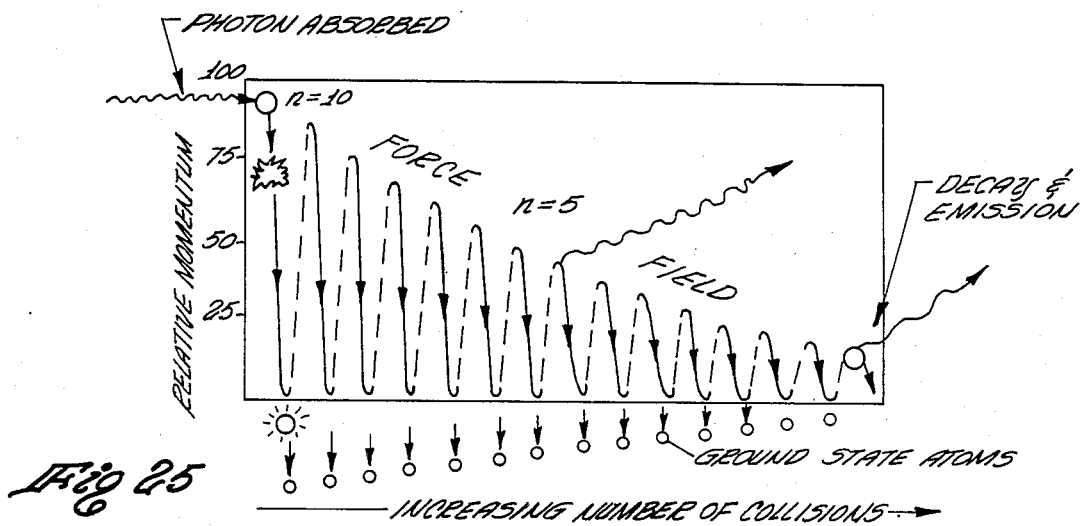
FIG. 25 is a graph illustrating the microscopic collisional processes between excited and ground state dipolar atoms forming the propellant matter.

FIG. 25 illustrates the mechanism of momentum exchange between an excited molecule (electronic) and a field of ground state molecules. By this process of rebounding collisions, additional impulse is provided with little added energy. The process begins by the absorption of a photon of energy by the particle which becomes more electromagnetic responsive and is thereby accelerated downward by the high frequency Lorentz force field. Only the momentum component in the Z-direction (thrust) is shown. The excited molecule or atom has an increased collision cross section which effectively increases the collision frequency. Because the mass of the excited particle is equal to the ground state molecular mass, the momenta is simply exchanged upon collision. If the energy of collision does not correspond to a transitional energy gap (rotational, vibrational or electronic), of either molecule, the collision will be perfectly elastic. The graph shows the reference line (horizontal) translated back to the top of the graph after each collision to keep the motion depicted within the boundaries of the graph. During the collision process, the excited molecule may gradually decay with the emission of a photon. As a consequence, the dipole moment may decrease, with a resultant diminishment in the momentum imparted by the force field. However, the radiation emitted may be absorbed by another adjacent excited or ground state molecule, so that the photon energy is repeatedly utilized until the gas eventually thermalizes (by which time the gas has already been fully accelerated).

The attainment of high thrust for the least amount of power requires few as possible excited states with large collision cross sections transferring their momentum to the greatest number of ground state atoms. Thus, the graph of FIG. 25 shows the momentum or impulse exchanged versus the number of collisions experienced by an excited atom before it is quenched. The rebounded excited atom is turned each time by the force field and collides with additional ground states. If the dissipation of energy is minimal, the excited state can undergo many collisions in this way before it is extinguished by quenching or radiative decay (deactivation). For example, the sea level collision frequency is $10^9$ Hz in air; if the lifetime is 10 microseconds, the total number of collisions possible is $10^9 \times 1.0 \times 10^{-5} = 10^4$ collisions. Accordingly, the momentum induced in the excited Rydberg particle is transferred to thousands of ground state atoms. In this arrangement a very low B field is possible while securing high performance. This is further realized when one considers the large collision cross section of an excited particle relative to a ground state atom; it can be millions of times larger since it increases with the fourth power of the P.Q.N., ($n^4$). The effect of the larger collision cross section is to increase the collision frequency, which is directly proportional to the cross section.

Figure 26:
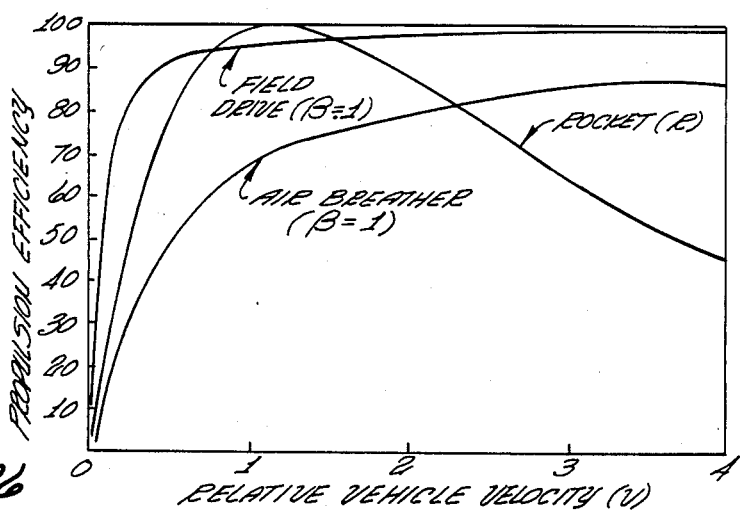
FIG. 26 is a graph of the comparative propulsion efficiency of three known spacecraft systems versus the relative vehicle velocity of the spacecraft.

The propulsion efficiency (thrust power divided by rate of propellant energy release) shown in the graph of FIG. 26 is for three different classes of propulsion systems: rockets, conventional air breathing ramjets or jet engines and a force field propelled system as disclosed herein. The propulsion efficiency equations for the rocket and airbreather respectively are:

$$n_{rocket} = \frac{2v}{1 + v^2} \quad (51)$$

$$n_{air\ breathen} = \frac{1}{\frac{\beta}{2v} + 1} \quad (52)$$

where
$v$ = ratio of Vehicle Velocity to exhaust and
$\beta$ = ratio of delta velocity of air to exhaust of a rocket.

The present force field propulsion system is an air breather in which very low delta velocities are possible due to the interaction with a very large volume or mass of air with dimensions comparable to the size of the vehicle itself. An external force field arrangement could be used in the arrangement. As illustrated in FIG. 24, rockets gradually reach peak propulsion efficiency as their vehicle velocity approaches their exhaust velocity. Thereafter, the efficiency thereof gradually tapers off. In a ramjet or jet engine, the efficiency gradually increases in a slow and steady fashion. However, when the spacecraft reaches high altitude where the atmosphere density becomes too rarified, the jet engine must be shut down. This occurs at about 100,000 feet. In a force field, air breathing system, operating at low delta velocities over large volumes, the efficiency more rapidly increases at lower vehicle velocities and maintains nearly 90%+ efficiency as velocity increases. Such engines can continue operation at nearly twice the altitude of conventional air breathing engines, with electrical power being supplied by some internal primary energy source such as a nuclear reactor.

Figure 27:
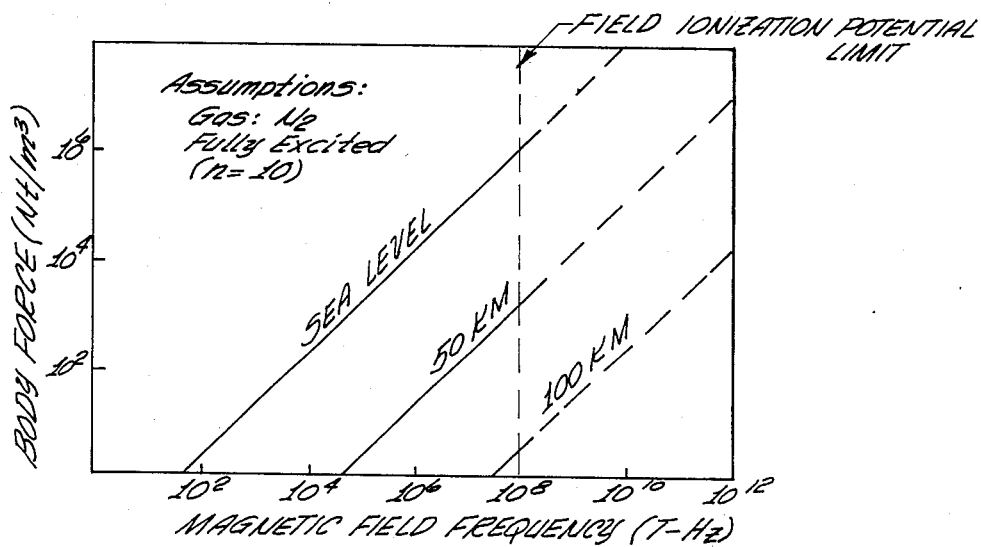
FIG. 27 is a graph of the body force developed in a gaseous atmosphere plotted as a function of the magnetic field frequency for several different altitudes.

FIG. 27 illustrates the possible body force plotted as a function of magnetic field frequency in Tesla-Hertz for a fully excited nitrogen gas at the quantum level of $n = 10$. he plot is for different altitudes commencing at sea level, 50 kilometers and 100 kilometers. When the magnetic field frequency approaches approximately $10^8$, field ionization limit is reached which is illustrated by dashed line 680. The field ionization limit is that point where the gas commences to ionize which reduces the efficiency of the dipolar force field propulsion system.

Figure 28:
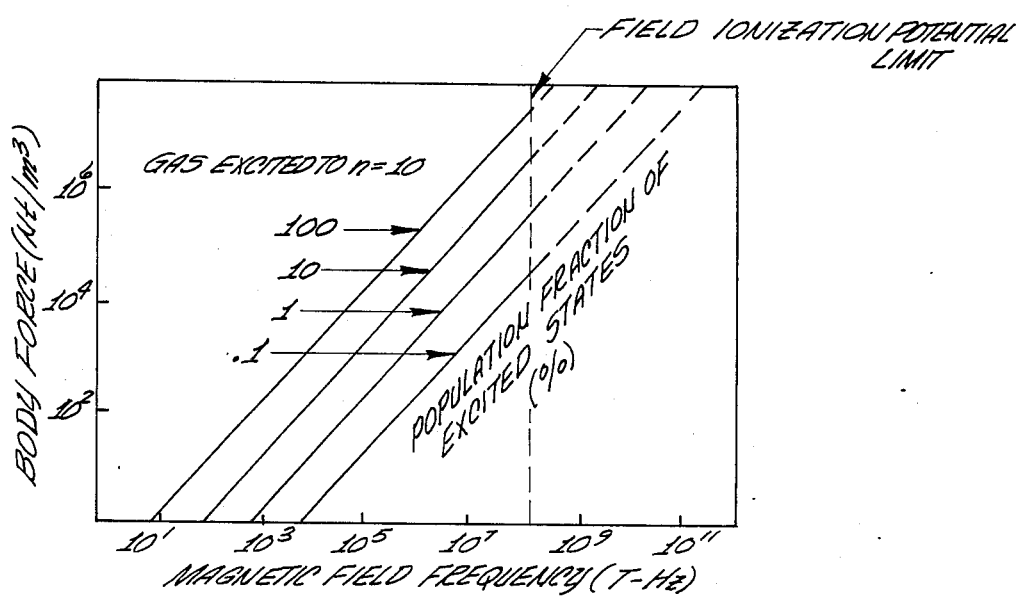
FIG. 28 is a graph of the body force plotted as a function of the magnetic field times frequency product for various levels of excitation states of a vaporized gas utilized as a propellant.

FIG. 28 is a plot of the body force for various levels or fractions of excitation plotted as a function of the magnetic field frequency in Tesla-Hertz for gas excited at the quantum level of $n = 10$. When the product of the magnetic field times the frequency approaches $10^8$ and the population fraction of excited states approaches 100%, the body force is extremely high. A field ionization limit occurs at about $10^8$ Tesla Hertz as is illustrated by dashed line 682 in FIG. 28.

FIGS. 29, 30, 31 and 32 show the construction details of a spacecraft generally referred to as a "X-wing" aerospace vehicle which is adapted to utilize the teachings of the present invention.

Figure 29:
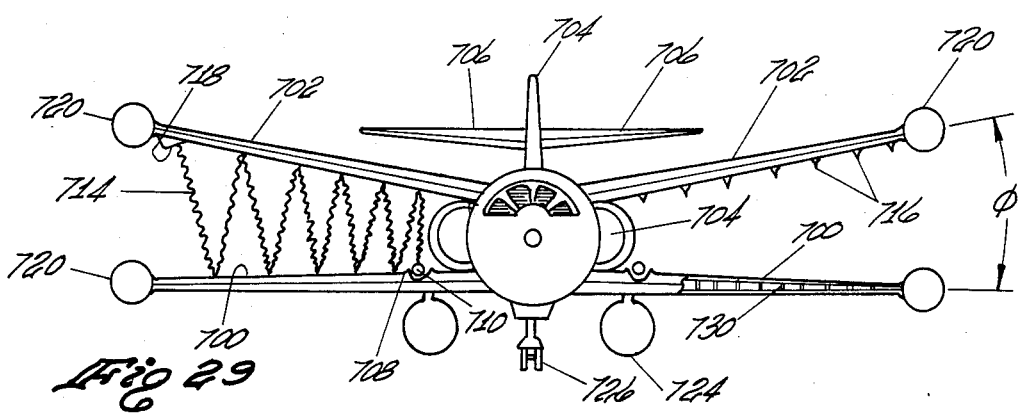
FIG. 29 is a front plan view of an "X-wing" spaceshuttle aircraft utilizing the teachings of the present invention.

The spacecraft includes a lower set of wings 700 and an upper set of wings 702. If desired, the angle between the upper and lower wings can be variable for efficiency optimization purposes. The aircraft utilizes a verticle tail 204 and horizontal stabilizing fins 706. A source of electromagnetic radiation, such as an elongated flash tube 708 is located on the lower wing 700 and positioned to direct the electromagnetic radiation generated thereby toward the undersurface of the upper wing 702. The upper wing 702 includes prismal reflecting member 716 which are adapted to reflect the ultraviolet radiation designated by arrow 714 between the upper and lower reflective surfaces of the wing 700 and 702. The final radiation is return reflected by reflector 718 located at the extremity of the upper wing. At the terminus of each wing is located a pressurized liquid hydrogen storage tank 720. The front plan view of FIG. 29 shows that the aerospace vehicle includes air intakes 706, has a fuselage 722, landing wheels 726 and, if desired, auxiliary airbreathing jet engines 724.

Figure 30:
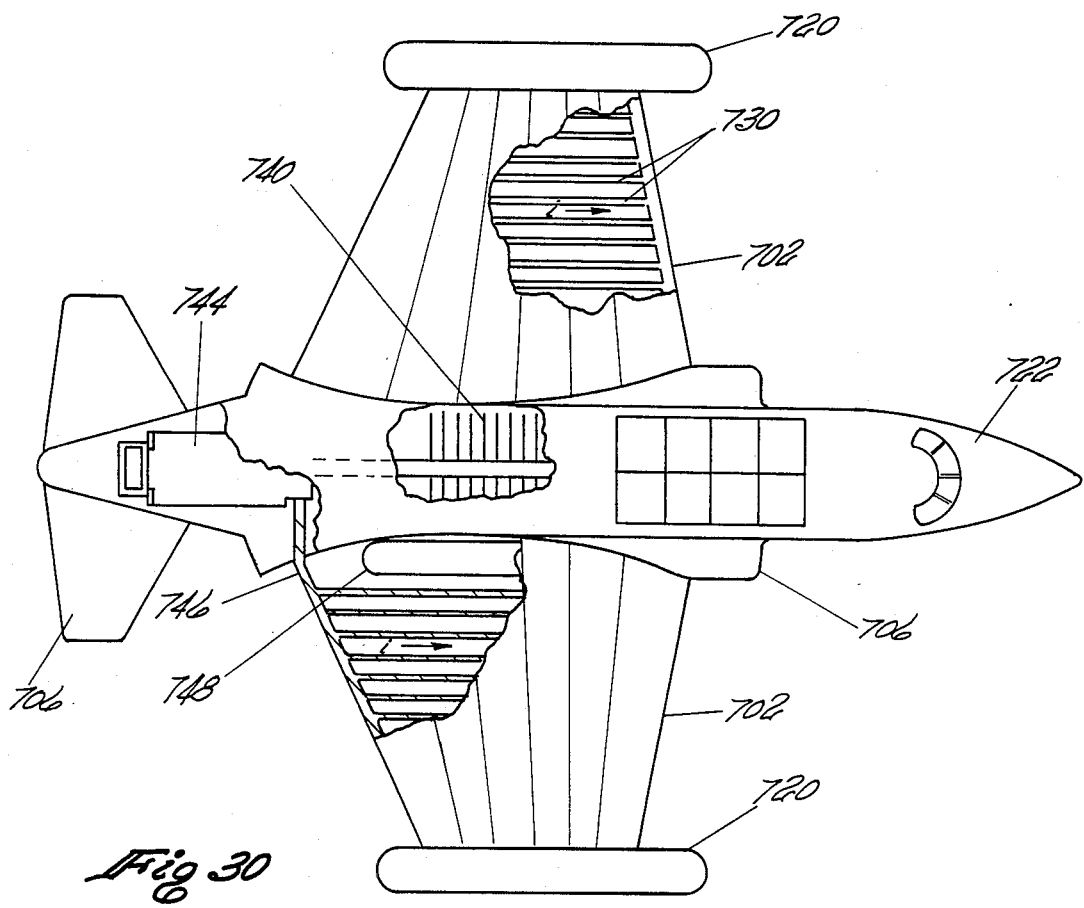
FIG. 30 is a top plan view, partially in section, showing the "X-wing" shuttle spacecraft of FIG. 29.
Figure 31:
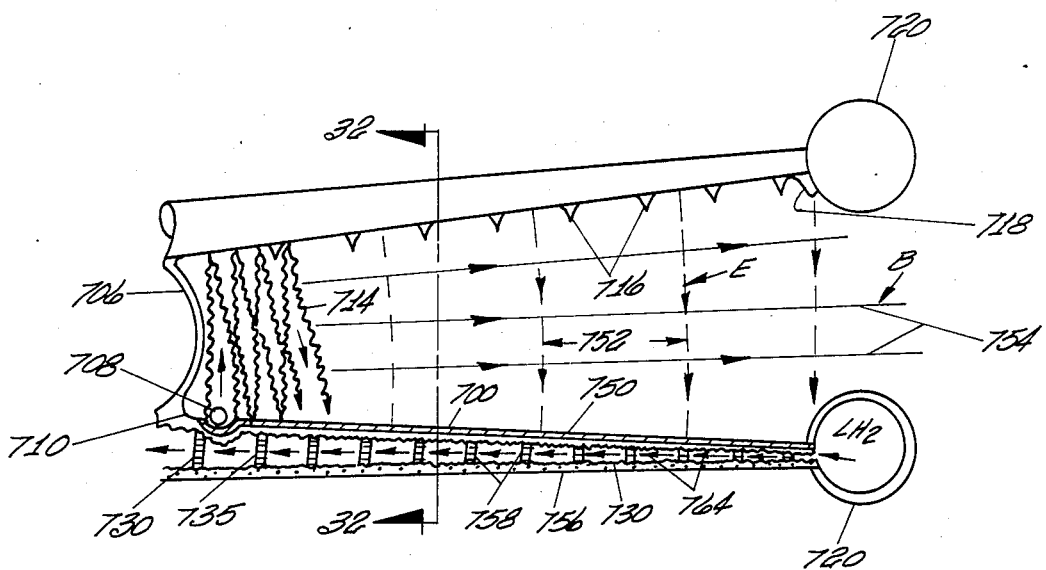
FIG. 31 is a pictoral representation, partially in section, showing the details of the construction of the upper and lower wing of the "X-wing" shuttle spacecraft of FIG. 29.
Figure 32:
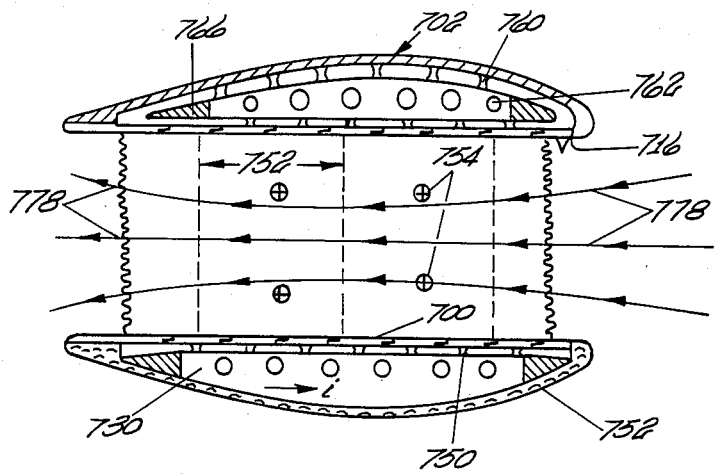
FIG. 32 is a sectional view taken along section lines 32—32 of FIG. 31.

The details of the construction of the wings is illustrated in greater detail in FIGS. 30, 31 and 32. The inductive coils are formed by strut numbers 730 which are adapted to be a plurality of spaced aligned members and which are adapted to carry a current therein as illustrated by the current flow arrow. The strut members 730 are covered by a conductive surface 734 which function as the conductor plates for confining the dielectric gas therebetween. In the preferred embodiment, the main power plant for generating the alternating current power may be a rotating nuclear bed reactor which is similar to that illustrated in connection with FIG. 21. The blades of the turbine are illustrated as 740, the high frequency generator illustrated at 744 which is coupled to the rotating nuclear bed reactor by the clutch 742. The strut number 746 of wing 702 function as part of the secondary winding of the transformer type coupling member which is operatively coupled to the high frequency generator 744.

FIG. 31 illustrates in greater detail the construction of the upper and lower wings and the means for generating the electromagnetic field and the electromotive lines of force to establish the E field. The excitation source 708 generates the electromagnetic radiation 714 which is reflected from the optical surfaces of the wing 702 which functions to excite the atoms of nitrogen gas in the atmosphere to a higher quantum level. The gases are confined between the upper wing 702 and the lower wing 700 which establishes the E field shown by lines 752 which pass between the wings and from the pointed ends of members 716 and the B field which emanates from the fuselage, as line 754. Thus, the area between the wing 700 and 702 function as a spatial force field region which has the excited nitrogen gas particles located therebetween and which, in the presence of the crossed magnetic field and electric field, cause the dipoles thereof to rotate and cause the reactive thrust.

The details of the wing construction disclose that the upper surface of wing 700 is conductive while the lower surface 756 is an insulator. Internal struts 730 are insulated from the upper surface of wing 700 by insulator spacers 750. Also, each of the struts 730 contain passageways 758 which is adapted to permit hydrogen liquid 760 to pass therebetween. The hydrogen gas acts as a coolant in addition to being used as a fuel and can be utilized to cool the superconducting magnets which generate the magnetic field indicated by arrows 754.

FIG. 32 illustrates, by means of a cross section, the relationship between the upper wing 702 and the lower wing 700 and the specific construction of the various wing struts. The upper wing 702 is insulated from a center support 762 by an insulator 764.

In a similar manner, the lower wing 700 has the center strut 720 insulated from the conductive upper surface 774 by means of insulators 750. Wing struts 730 have the lower outer surface which is formed of insulating materials 756 affixed thereto. The airflow between the wings is illustrated by arrows 778. The direction of the B field is illustrated by vectors 754 which are extending outward from the fuselage toward the end of the wings. The electromotive lines of force of the electric field as shown by lines 752 and extend between the lower wing 700 and the upper wing 702.

Figure 33:
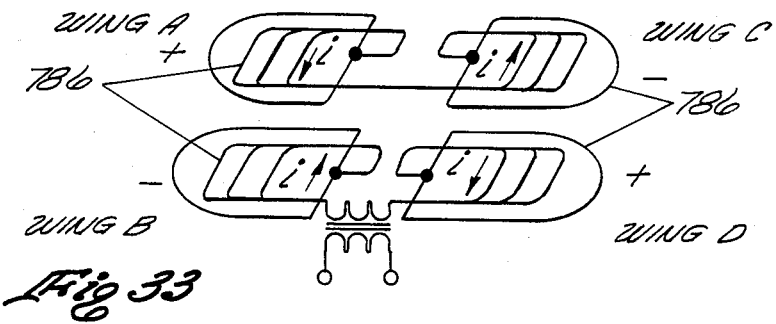
FIG. 33 is a schematic diagram showing the inductance and capacitance of the wings of the "X-wing" shuttle spacecraft of FIG. 29.

FIG. 33 is a schematic representation of the inductance coils and electrodes forming the same 786 which are located in each of the wings. The inductors are driven from a high frequency alternating current source through a transformer coupler illustrated as 788.

Figure 34:
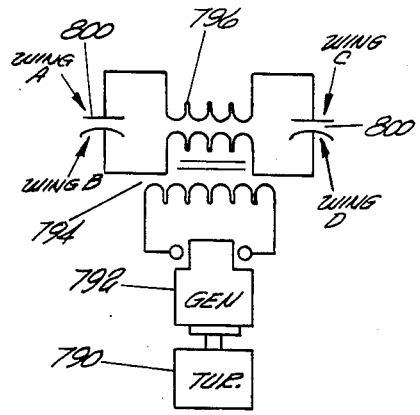
FIG. 34 is a schematic diagram of an alternating current power source for supplying electrical power to the inductive and capacitive components of the aircraft of FIG. 29.

The power source which is adapted for use in the "X-wing" aircraft is illustrated in FIG. 34. In operation, a power source, such as a turbine 790, drives a high frequency generator at the selected frequency. The high frequency output is coupled through a transformer coupler 794 to the wing and to the inductors 796 which are connected in series with the capacitors 800 formed between the upper and lower wings.

Figure 36:
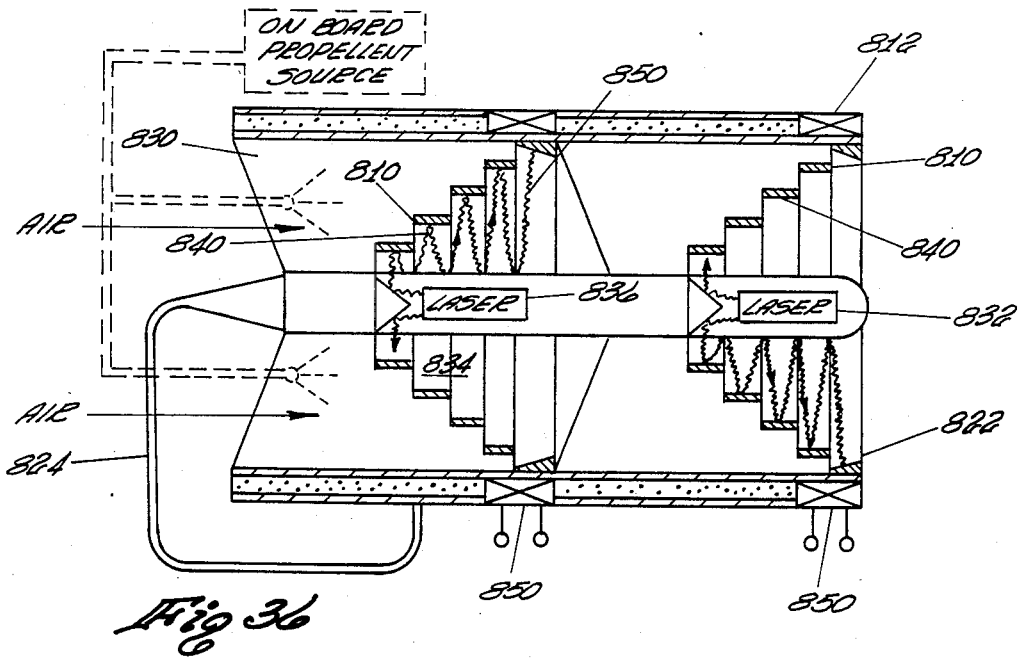
FIG. 36 is a front plan view of the two stage inductive dipolar force field propulsion system of FIG. 35 showing the spiral coil winding in detail.

The embodiment of the invention shown in FIGS. 35 and 36 utilizes the inductive electric field due to the motional magnetic field as given by Faraday's Law:

$$\int E \cdot dl = -(d\varnothing/dt) \tag{53}$$

For a solenoidal coil, the Azimutha L electric field produced is given by the following equation:

$$E = -\frac{1}{2} R_c \frac{dB}{dt} \tag{54}$$

or $$E = ;\frac{1}{2} R_c W B_o \cos wt$$

Combining with equations (1), (6) and (54), we obtain:

$$F_b = ; \frac{1}{2} t_o \lambda_e R_c B_o^2 w^2 \sin w^2 t \} \lambda_e = N\alpha, \tag{55}$$
the electric susceptability which is the body force produced in a dielectric gas subjected to an inductive high frequency magnetic field. The force increases with the square of the magnetic field and frequency. An upper limit is reached when the induced electric field becomes so intense that electrical breakdown and ionization of the gas takes place. The invention is preferably operated at such a frequency and magnetic field condition so as to avoid ionization and the problems which would thereby ensue. It should be pointed out that in the presence of a transverse magnetic field, the breakdown voltage of a gas is increased significantly. FIG. 21 is a graph of the potential body force established in the atmosphere for various altitudes for an assumed excited state gas having a P.Q.N. of 10. The upper limit where ionzation will approximately start to take place is also shown in this Figure.

For sea level, the field ionization limit is reached where the product of the magnetic field times the frequency reaches $10^7$–$10^8$ volts per meter. At higher altitudes, this number decreases as the ambient conductivity increases. Even so, body forces of $10^3$–$10^4$ NT/m$^3$ are possible at megacycle frequency at sea level. This has been discussed in detail with respect to FIGS. 27 and 28 hereinbefore.

As shown in FIG. 35 and 36, the magnetic field is generated inside of a conical shaped spiral coil 810 consisting of a number of turns each parallel connected to minimize the inductance to permit resonant operation in a series tuned circuit at megacycle frequencies. The coil is preferably made of lightweight material such as aluminum alloy and housed in a structure 812 designed to handle the mechanical stress of the magnetic field pressures. The coil is cryogenically cooled via input flanges 820, and hollow conductors, with an exit plenum 822. If the coolant is water (which is a dipole), it may be injected as a fine spray via conduit 224 into the acceleration cavity 826 to enhance the thrust and reduce the levels of excitation required. The water vapor may also be the combustion products of a liquid hydrogen and oxygen rocket driven MHD generator.

The dipolar propulsion unit has an entrance or intake manifold or shroud canapy 830 through which the working fluid such as air enters and is directed into the Lorentz propulsion chamber cavity. The coil elements 810 consist of flat strips through which air is free to pass and are held in rigid position by the insulator attenuator fins 814 which also act to attentuate the exterior unwanted upstream electric field. A source of ultraviolet excitation radiation such as an excimer laser 832 is provided which directs its beam into an optical cavity 834 consisting of a reflecting fresnel surfaces 880 on the conductor strips which bounces the beam 850 back and forth between the surfaces hundreds of times to increase the absorption pathlength and permit more efficient utilization of the radiant energy. The wavelength of the excitation source is choosen such that the photon energy (hv) lies just below the ionization potential of the atoms of the gas, e.g. 1300 Angstroms wavelength. The radiation is thus readily absorbed by the gas and converts the ground state neutral atoms or molecules into highly excited Rydberg or metastable states that more readily electromagnetically coupled to the high frequency magnetic field. It is particularly important that this excitation source have a high energy transformation efficiency to minimize overall power consumption. Electron impact may also be used as described earlier, using the output, e.g. of a Tesla coil. For low velocity, high volume applications, only a small fraction of the total ground state number flowrate into the unit need be converted into an excited state. Additionally, electrodes may be added to provide directional control of forces.

In summary, the device operates as follows: Air enters the upstream entrance 830. No electric field is experienced because the insulating fins or struts attenuate the field on the upstream side. The air moves through the passages between the conducting strips 810 and is immediately excited at the same time high frequency polarization currents are induced in the gas. The gas is thereby accelerated to a moderate exit velocity at a very large mass flow rate. The residence time during which the gas is accelerated is at least equal to or less than the lifetime of the excited states in the gas, such as metastable oxygen. An alternate method of excitation involves the applications of a attentuating current high voltage to ionize some of the air and excite atoms by electron impact.

The dipolar force field propulsion system has wide application, particularly as a propulsion means for aerospace vehicles such as spacecraft. The aerospace vehicle utilizing the dipolar force field propulsion system can be propelled in the atmosphere of earth or vacuum of space. The propellant gas can be cryogenically cooled and be used for cooling superconducting magnets and can be boiled off and used as a propellant.

Also, the dipolar force field propulsion system of this invention can be combined with other known propulsion systems, such as a plasma propulsion system using hot ionized gases. By controlling the spatial angle between the E field and B field, the thrust of the dipolar force field propulsion system can be controlled.

In FIG. 36, the alternating current high voltage is applied to the propulsion unit through a coil excitation transformer 850. The coil excitation transformer establishes the B field in the conductive strips (810) in order to energize the embodiment described in connection with FIG. 35 and 36.

The block diagram of FIG. 37 shows the alternating current power source for applying the alternating current power to the propulsion system. A high frequency oscillator 860 drives an amplifier 864 which has as an additional input thereto an alternating current power supply 862. The amplifier applies the high voltage alternating current signal through the coil excitation transformer coupler 850 to drive the propulsion unit with the inductance and capacitance thereof shown as 866 and 868, respectively.

FIGS. 38 and 39 show another embodiment for practicing the invention in the form of an VTOL vehicle.

FIGS. 38 and 39 show an embodiment designed for VTOL utilizing a radio frequency inductive magnetic field. The field generates an azimuthal electric field which, in turn, generates a polarization current body force which acts vertically. The capacitance element for tuning the coil is incorporated into the vehicle's structure itself covering the full diameter of the vehicle and stores electrical energy which is cyclically converted into magnetic field energy of the coil as described in connection with the simple LCR tank circuit illustrated in FIG. 7. The coil is a spiral winding which is formed by elements 900 which is supported in a vertical extending position as illustrated in FIG. 38 by an insulating strip 902. The oapacitive surface is formed by upper outer surface 904 and inner surface 906 which is separated by an insulator 908. The coil defined by elements 900 can be in the form of a spiral winding consisting of a number of turns, such as eight, which is parallel connected at both ends so as to reduce the equivalent inductance of the coil defined thereby. The coil is terminated at one end thereof by electrically connecting the same to one of the electrodes defining the capacitor, such as for example, electrode 904, and the other end of the coil is connected to the other capacitor electrode such as inner capacitor electrode 906. The coil is excited by an excitor coil 910 which is located in the center and driven by a high frequency generator 912 which is powered by a gas turbine engine 914 through a coupling clutch 916. The generator 912 can be a superconductive generator which can generator ten kilowatts per kilogram of generator mass. A superconductor generator which is capable of generating this level of power is presently offered for sale by General Electric.

The exhaust from the turbine is exhausted through ports 920 which are defined by a shroud cover 922.

The generator 912 also supplies electrical power to flashlamps 930 which are located beneath the vehicle and surrounded by a reflective surface 932. The flashlamps 930 generate vacuum ultraviolet radiation in a controllable manner to excite the gas in selected regions underneath the field coil defined by windings 900.

FIG. 39 is a top view, partially in section, which illustrates the spiral coil windings 900. The coil consists of a flat ribbon conductors, preferably constructed as light as possible and formed of material such as aluminum alloy. The coil is electrically isolated via standoffs 942 from the high voltage plates formed by surfaces 904 and 906 which define the plates of the capacitor. The capacitor defined by the upper plate 904 and lower plate 906 is preferrably regularly slotted with slots 940 to prevent the formation of any eddy current losses due to the alternating magnetic field. The capacitor defined by the upper plate 904 and lower plate 906 provides structural support for the windings of the coils 900 through the insulating standoffs 942. Thus, large magnetic pressures can be developed between the upper and lower surfaces 904 and 906 defining the capacitor, the insulating standoffs struts 942 and the windings 900.

As illustrated in FIG. 39, the air flows over the outer rim as well as through the central core which is indicated by arrows 960. The air flow aids in collectively cooling the coil windings 900.

FIGS. 40 and 41 illustrate a method of directional thrust control based upon an adjustable reflector 960. The principle is illustrated diagramatically in FIGS. 42a, 42b and 42c. As long as the excitation source 962 radiation (here assumed to be flashtube) is symetrically distributed below and around the vertical axis of the vehicle 970 as shown in FIG. 42a, the thrust is vertical through the center of gravity of the vehicle. However, in FIG. 42b, if the field of radiation is shifted to one side, an increase or asymetry of excited states on that side of the vehicle exists resulting in increased thrust, which tilts the vehicle producing a horizonal thrust component moving the vehicle to the right. Moreover, the reflector 963 can be rotated through 360° in a plane parallel to the vehicle structure. Horizonal thrust component can be directed accordingly, as shown in FIG. 42c, where the reflector 962 has been rotated through 180°.

Figure 46:
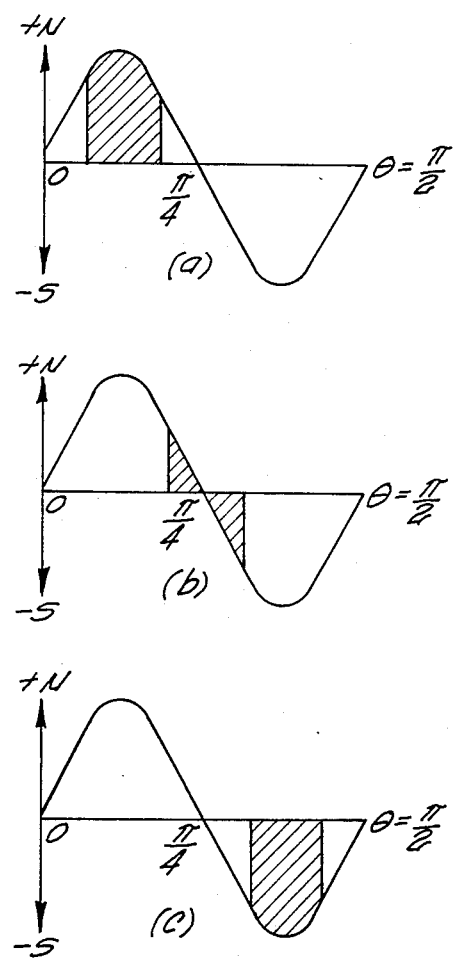
FIGS. 46a, 46b and 46c are graphs showing the resulting field polarity and magnitude with the ferrite rotor in various angular positions as illustrated in FIGS. 45a, 45b and 45c, respectively.
Figure 47:
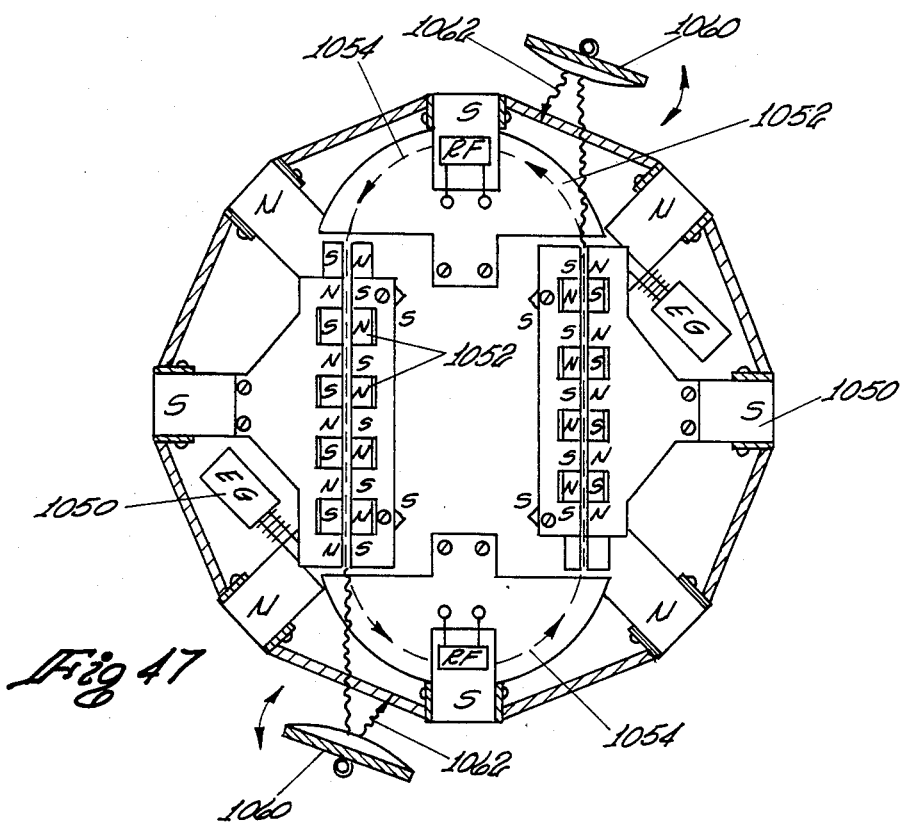
FIG. 47 is a top plan view of the magnetic configuration of a spacecraft utilizing the inductive dipolar force field propulsion system of the present invention as a means for generating a reactive thrust adapted for propelling a spacecraft utilizing a wiggler magnet arrangement as a means for accelerating an electron beam and producing a controllable continuum of vacuum ultraviolet radiation for excitation of the ambient gaseous atoms to an electronic excited state.

The construction of the directional control reflector 962 and ultraviolet radiation source 960 are more clearly understood by referring to FIG. 46 and 47. Two flashtubes rotatably mounted about an axis 1000 below a platform 1002 supported by bearings 1004. A gear wheel 1006 fixed to the vehicle structure. The flashtubes 960, surrounded by reflectors 962 are adjustably mounted for rotation via a linear gear rack actuator 1012 acting upper semi-gear wheel 1014. The power to the flashtubes is supplied via a pair of commutator rings 1016, and connecting arm 1018. The reflector 962 is rotatably mounted to the axis of the flashtube via spoke structure 1020. The component effect is that the radiation field from the curved reflector 962 can be varied through 90 degrees of rotation about a horizonal axis from a horizontal plane to a verticle plane, as well as through 360 degrees about a vertical axis.

The vehicle VTOL dipolar propulsion system shown in FIG. 43 consists of a number of magnets arranged with their axis radially directed, with each alternate magnet of opposite polarity. The top field above the centerline of the magnets is shunted into the vehicle structure, without however effecting the external field below used to accelerate the ambient gas. This top field can now be used to bend a relativistic beam of electrons to produce ultraviolet (1000 A°) synchrotron radiation in the direction target to the beam, and, via an appropriate window and optical reflectors, direct the UV radiation into the gas for excitation of said gas.

Figure 44:
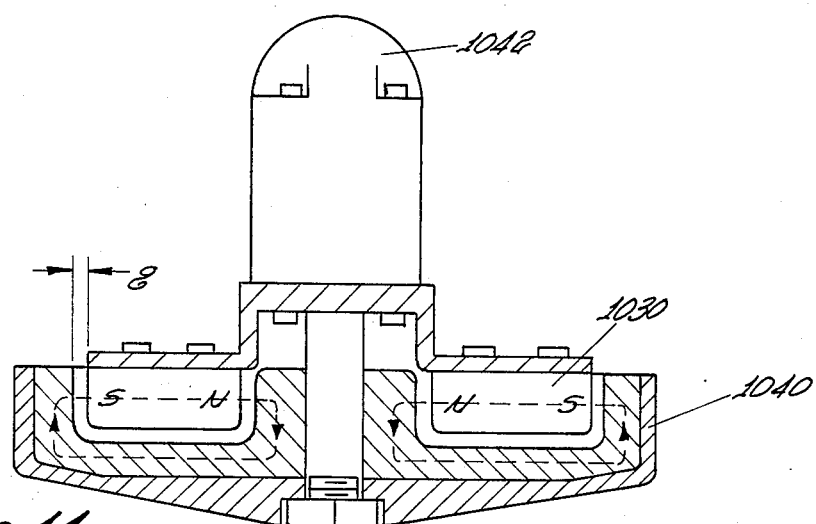
FIG. 44 is a pictoral representation partially in cross sectional view, showing fixed magnets in a rotating ferrite slotted disc.
Figure 45:
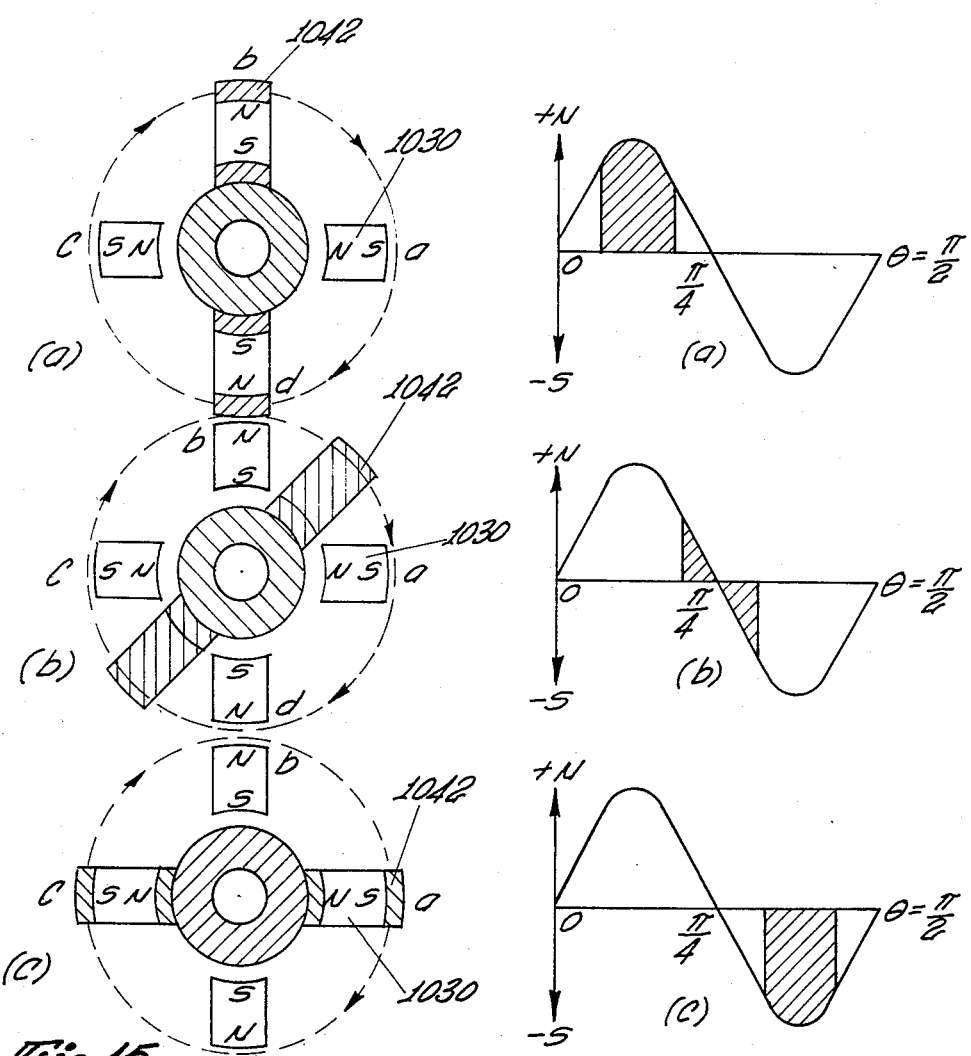
FIGS. 45a, 45b and 45c are a series of pictoral representations showing the ferrite rotor in various angular positions relative to the magnets.

The method of generating an alternating magnetic field is shown using D.C. superconductive magnets 1020 or permanent magnets. Use of the D.C. superconductive magnets with rotating ferrite shunts eliminates the A.C. current losses in the superconductive magnet arising therefrom due to resistence thereof, if the superconductive magents were operated in an A.C. mode to generate the same alternating magnetic field. The magent coils are arranged in a circle with alternate magnets in reversed field direction. A slotted ferrite disc 1040 rotating at high speed shunts the field of all magnets in one direction as shown in FIG. 44 leaving the unshunted field of the others expelled into the surrounding dielectric gas. The device is more clearly illustrated in FIG. 45 which graphically illustrates the magnitude and direction of the external field as the ferrite rotor 1040 is rotated by motor 1042 through several different angular positions. In 46a, the outward (north) positive fields of magnets 1030 are shunted through the ferrite leaving the inward (south) negative field unshunted and exposed to interact with the dielectric gas. As the ferrite rotor moves 22.5° to the position shown in FIG. 42B, a neutral position is reached where the external field is approximately zero, as averaged, over the 45° of rotation. When the rotor 1040 reaches position shown as 42c, the ferrite shunts the onward (south) negative field, leaving the outward positive field exposed to the gas.

Thus, through 90° of rotation the field has gone through a complete cycle of outward and then inward reversed field. The frequency of the alternating field is given by $$f_r = N_r (R.P.S.) \tag{56}$$

where $N_r$ is the number of magnet pairs of opposite polarity, and (R.P.S.) the frequency of rotation in revolutions per second (R.P.S.). The speed of rotation has been found by Beams to be limited to the rim velocity reaching the speed of sound of the material; where the centrifugal forces induce stresses sufficient to tear the rotor apart. Preferably, the ferrite rotor is reenforced with high strength material such as glass filaments. For example, a 1 meter diameter ferrite rotor spinning at 500 R.P.S. with 100 coil pairs mounted on a nonrotating frame could generate an intense field alternating at 50 kilocycles. For a fully excited gas (air at sea level), the thrust generated is sufficient to lift the vehicle even using rare earth magnets. The 500 R.P.S. or 30,000 R.P.M. could be generated by a gas turbine engine. Positive torque is required to break the magnetic field, but negative torque is obtained as the ferrite is attracted to the next coil. Hence, the average torque due to magnetic attraction is zero. The power is absorbed to reverse the field through the ferrite which has small losses since it is an insulator. Some heating is expected so air circulation is desirable to keep the rotors cool and prevent the superconductive magnets from heating up and going resistive.

Figure 48:
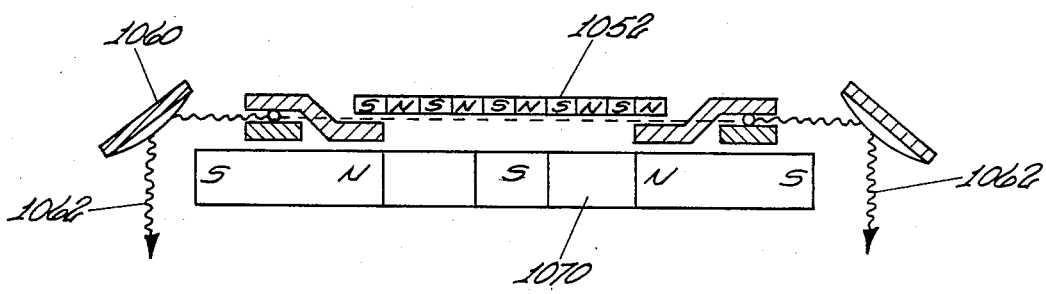
FIG. 48 is a pictoral representation of the front plan view of the magnetic configuration illustrated in FIG. 47.

FIGS. 47 and 48 illustrate a VTOL version of this method of field generation. The ferrite rotor rotates in a horizontal plane beneath the magnet coils arranged in a circle near the rim. A top row of ferrite plates fixed over the coils is used to shunt the field over the top of the vehicle which could produce an adverse downward force. The air gap between these plates and the coils is adjusted for this purpose. The radiation field used to excite the gas is derived from a free electron laser (FEL) 1050 using the same coils as the propulsion magnets 1052. Electron guns are arranged near the rim of the top edge of the superconductive magnets 1052 and direct their electron beams 1054 in a circular path. The fields bend and accelerate the beam, 1054. The acceleration produces synchrotron radiation in the far ultraviolet region which is directed to reflector 1060 which reflect the radiation 1062 downwards beneath the vehicle to excite the air. The excited air then interacts with the azimuthal electric fields produced by the alternated fields, is repelled downward, setting up a flow pattern around the vehicle as shown which generates the vertical thrust.

FIG. 48 illustrates pictorially the physical arrangement between the magnets 1052, the shading magnets 1070 and the radiation 1062 traversing the magnets 1052 onto the reflector 1060.

Figure 49:
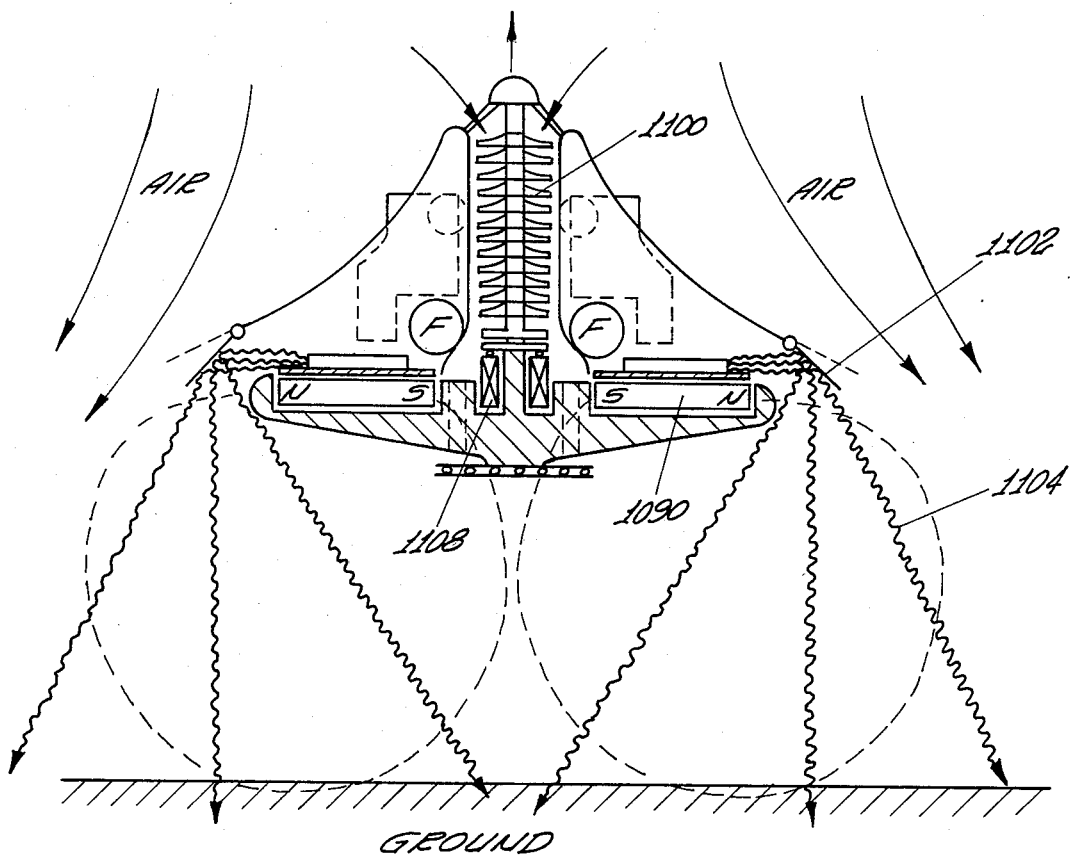
FIG. 49 is a pictoral representation, partially in cross section, showing an embodiment of a VTOL vehicle which is adapted to utilize gaseous atoms in the atmosphere as a propellant and for exciting the same with a source of radiant energy in order to cause the VTOL to hover near the earth's surface.

FIG. 49 is a pictorial representation of an aerospace vehicle using the dipolar force field propulsion system in combination with a rotating shunt plate 1092 and superconducting magnets 1090. An appropriate energy source 100 is used for the aerospace vehicle. The radiation for exciting the particles 1104 is directed by reflectors 1102 to excite the gaseous atoms in the atmosphere under the spaceship. The electrical energy developed by the generator 1100 is rotatably coupled to the magnets through an electromagnetic coupling means 1108.

HIGH ALTITUDE OPERATION

At high altitudes, the artificial excitation source can be deactivated and the natural ultraviolet radiation from the sun used to excite the air. Such phenomena is known in geophysics as "airglow," dayglow, nightglow and "aura borealis."

In addition to carrying power on board the vehicle for the purpose of exciting the gas around the vehicle, the gas may, to some extent, be excited from external sources such as a ground station or geosychronous power satellite. This has the distinct advantage of reducing weight. However, the frequencies are restricted to those which will propagate through the atmosphere with little attentuation, such as the visible and down to the microwave region; ultraviolet being highly absorbed. Thus the vehicle carries its own ultraviolet radiation source, such as from a syncrotron radiation source which can be varied to provide any desired distribution of wavelengths, e.g. by changing the energy of an electron beam. The absorbing frequency of the excited gas is given by the following equation for simple hydrogenic atoms:

$$v = CR_R \left( \frac{1}{n_l^2} - \frac{1}{n_u^2} \right) \tag{57}$$

where (n1) is the P.Q.N. of the lower state of interest and ($n_u$) is the upper state of interest. For excited states with n=40, and higher, the gas will absorb microwaves and increase the polarization, especially at higher altitudes where gas temperature and pressure is reduced. Thus, a ground station microwave source could enhance the polarization around a high flying electromagnetic aerospace vehicle.

In addition to absorption by electronic states, which enhances polarization for thrust augmentation purposes, other vibrational or rotational states may be created to absorb wavelengths of a specific nature to avoid reflection and consequent detection. This could be done automatically, by sensing the offending frequency, and adjusting the energy of the electron beam to control the spectral distribution of the synchroton radiation so as to excite the gases around the vehicle and absorb completely the offending frequency. If the frequency changes, the electron beam is likewise changed to again permit absorption of the offending frequency.

It is envisioned that the spacecraft illustrated in FIG. 49 could be operated in a vacuum, such as in interstellar space. It has been found by recent experiments that a momentum reaction force can be generated by the field itself due to the EXB vectors. This phenomenon is described in an article by G.M. Graham and D.G. Lahoz entitled "Observation of Static Electromagnetic Angular Momentum in Vacuum," *Nature*, Volume 285, May 15, 1980.

Figure 50:
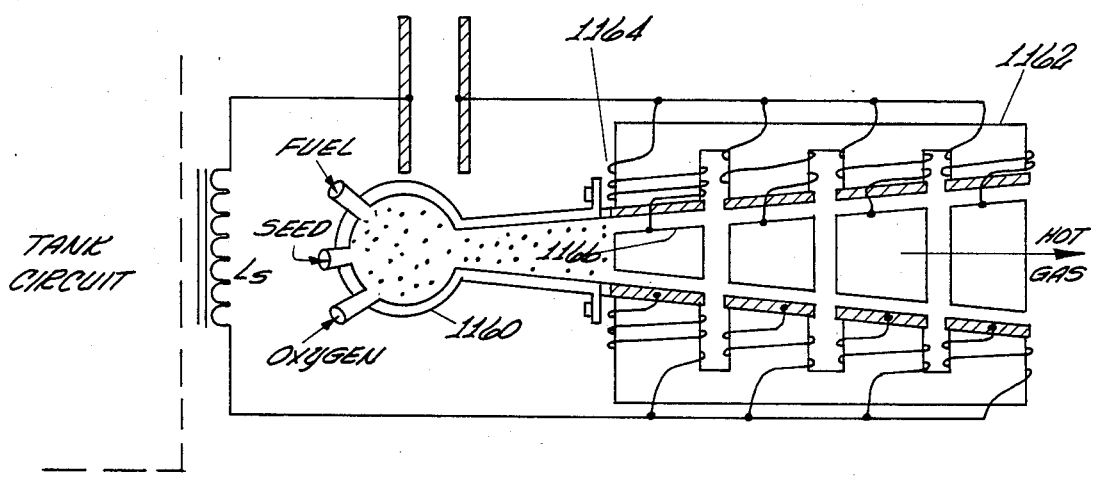
FIG. 50 is a diagramatic representation of an MHD plasma energy source having pumped mutually coupled LCR circuits which is adapted for use in the "X-wing" spaceshuttle illustrated in FIG. 29.

In FIG. 50, a method of cyclically pumping an LCR tank circuit by magnetohydrodynamics so as to sustain the oscillations against the transfer of energy into the primary propulsion tank circuit is shown. The device consists of a rocket engine (1160) injected with fuel, oxygen and seed material to produce an electrically conducting plasma which passes through channel at velocity Vg with electrodes 1162 and field coils 1164 and ferrite core 1166 to increase magnetic permeability in the channel. The coils 1164 generate a varying current in series with the coils perpendicular to the plane of the paper, according to the equation:

$$i = \frac{E}{R} = \frac{V_g}{R} B_0 \sin \omega t \quad \bigg) \quad R = \text{resistance} \tag{58}$$

The current charges up the capacitor element $C_s$ which discharges its current back into the coils at the resonant frequency that matches the primary circuit to the left.

The teachings of the invention have wide application. In its most generic application, the teachings can be utilized as a means for controllably accelerating a particle of matter having a selected dipole characteristic. Also, the invention teaches a method for controllably accelerating such a particle of matter.

The dipole force field propulsion system has utility for propelling an aerospace vehicle in the earth's atmosphere or in interstellar space. The propellant in the form of a cryogenic gas can be carried aboard the aerospace vehicle or the propellants can be external to but contiguous to the aerospace craft such as air or particles of matter or plasma in interstellar space. The energy sources likewise can be carried aboard the aerospace vehicle or can be external such as solar, microwave or laser excitation source.

What is claimed is:

1. A dipolar force field propulsion system comprising means for generating an alternating electric field having its electromotive lines of force extending in a first direction and which vary at a selected frequency, said electric field having an electric field strength of a predetermined magnitude;

means for generating an alternating magnetic field having its magnetic lines of force which extend in a second direction which is at a predetermined angle to said first direction and which crosses and intercepts said electromotive lines of force at a predetermined location to define a spatial force field region and wherein the frequency of oscillation of the alternating magnetic field is substantially equal to the said selected frequency and is at a selected phase angle relating to said alternating electric field, said magnetic field having a flux density which when multiplied times the selected frequency is less than a known characteristic field ionization potential limit;

a source of neutral particles of matter having a selected electric dipole characteristic and having a known characteristic field ionization potential limit which is greater than said magnitude of the electric field strength, said dipoles of said particles of matter being capable of being driven into cyclic motion at said selected frequency by said electric field to produce a reactive thrust;

means for vaporizing said particles of the matter into a gaseous state at a selected temperature below the thermal ionization level thereof and for transporting said vaporized matter in said gaseous state into said spatial force field region defined by said crossed electromotive lines of force and magnetic lines of force which coact with and drive said dipoles into cyclic motion at said selected frequency to produce the reactive thrust which is substantially normal to said first direction of said electromotive lines of force and to the second direction of said magnetic lines of force; and control means operatively coupled to said means for generating an alternating electric field and to said means for generating an alternating magnetic field and which is responsive to the dielectric properties of the vaporized matter located in the spatial force field region for establishing a predetermined spatial and time relationship between the electric field, magnetic field and dipole cyclic motion for a selected frequency.

2. Means for generating a reactive thrust force adapted to propel an aerospace vehicle comprising means for generating an alternating electric field which varies at a selected frequency and extends in a first direction, said electrical field having an electric field strength of a predetermined magnitude;

means for generating an alternating magnetic field at substantially said selected frequency which extends in a second direction which is positioned at a predetermined angle to said first direction and which crosses and intercepts said electric field at a predetermined location to define a force field region, said magnetic field having a flux density which when multiplied times said selected frequency is less than selected characteristic field ionization potential limit;

means for vaporizing neutral particles of matter into a gaseous state at a selected temperature which is below the thermal ionization level of said particle, said particle having a selected electrical dipole characteristic, a breakdown characteristic which is greater than the magnitude of the electric field strength and a selected characteristic field ionization potential limit, said dipoles of said matter being capable of being driven into cyclic motion at a selected frequency by said electric field;

means operatively coupled to said vaporizing means for transporting said particles of the material into said force field region wherein said crossing electric field and magnetic field coact with and cause said dipoles of matter to be driven into cyclic motion at substantially said selected frequency produce a reactive thrust force in a direction which is substantially perpendicular to said first direction and said second direction; and control means operatively coupled to said electric field generating means and said magnetic field generating means and responsive to the dielectric properties of the vaporized particles of matter located in said force field region for establishing a predetermined spatial and time relationship between the alternating electric field, the magnetic field and frequency of the cyclic motion of said dipoles said control means establishing said selected frequency at substantially the resonant frequency of a capacitance and inductance circuit formed by the electric field generating means, said magnetic field generating means and the vaporized particles of matter in the force field region.

3. The propulsion system of claim 1 wherein the predetermined angle between the first direction of the electric field and the second direction of the magnetic field is selected to be 90°.

4. The propulsion system of claim 1 further comprising means for raising the electronic excitation level of said particles of neutral matter in the vaporized gaseous state to a higher quantum level thereby increasing the magnitude of the selected electric dipole moment characteristic.

5. The propulsion system of claim 4 wherein said electronic excitation level raising means is a laser.

6. The propulsion system of claim 5 wherein said laser raises the quantum level of the particles of material to a quantum level between $n=1$ and $n=20$ by controlling the wavelength of the laser in step wise fashion to establish the dipole moment at a selected energy level which varies between the lowest energy level of the material at a quantum level of $n=1$ and a higher energy level which is below the thermal ionization level of the material at a quantum level of $n=20$.

7. The propulsion system of claim 4 wherein said electronic excitation level raising means is ultraviolet radiation.

8. The propulsion system of claim 5 wherein said laser originates from an external location.

9. The propulsion system of claim 1 wherein said magnetic field generating means are permanent magnets.

10. The propulsion system of claim 1 wherein said magnetic field generating means is a plurality of spaced, radially aligned superconducting magnets with the poles thereof alternately positioned relative to each adjacent magnet and a rotatable, ferrite magnetic material rotor which cyclically is transported past each of the radially aligned superconducting magnets to generate an alternating magnetic field.

11. The propulsion system of claim 1 wherein said magnetic field generating means is a coil.

12. A propulsion system comprising a plurality of U-shaped superconducting pole pieces positioned in spaced alignment to define a substantially rectangular elongated channel;

a plurality of coils positioned one each around the center of one pole piece;

a plurality of pairs of spaced, substantially planar conducting electrodes positioned with each spaced pair extending between the ends of the U-shaped pole pieces wherein one of the planar electrodes is located adjacent the coil and the other planar electrode is spaced therefrom a distance substantially equal to the length of the U-shaped pole pieces defining a spatial region defined on two boundaries by the pair of planar electrodes and on two boundaries by the U-shaped end of the pole pieces, each of the spatial regions of each pole piece and planar electrode pair being in alignment enclosing said substantially elongated channel;

means for electrically connecting one of the planar electrodes of the planar electrode pair in series with the coil associated with its respective pole piece and for electrically connecting each series connected planar electrode pair and coil in parallel with the other series connected planar electrode pairs and being adapted to be connected to an alternating electrical power source;

a radiation source positioned at one end of the substantially rectangular elongated channel for directing radiation through each spatial region defined by each planar electrode pair and pole piece ends;

a plenum positioned at said one end adjacent said radiation source adapted to transport a vaporized propellent gas having neutral particles of matter having a selected dipole characteristic at a controlled rate through said substantially rectangular elongated channel; and a cryogenic source of propellant gas comprising neutral particles of matter wherein the particles of matter have a selected electric dipole characteristic and a known characteristic field ionization potential limit, said cryogenic source being operatively coupled to said plenum through a means for vaporizing said propellant gas to a level less than the ionization level thereof and applying a continuous stream of vaporized propellant gas to said plenum, said electrical connecting means being responsive to a said alternating electrical power source to produce an alternating electric field across each planar electrode pair and an alternating magnetic field between each pole piece and which was the alternating electric field establishing a plurality of aligned spatial force field region into which the vaporized gas is transported by said plenum into said substantially rectangular elongated channel through each spatial force field region of each planar electrode pair and coil, whereupon the particles of matter of the propellant gas are raised to an electronic excitation level by said radiation source and the crossing electric field and magnetic field which cause the dipoles of the particles of matter to be driven into cyclic motion to produce a reactive thrust.

13. The propulsion system of claim 12 wherein said radiation source is a laser.

14. The propulsion system of claim 12 wherein said means for vaporizing the propellant gas includes cooling means located adjacent each coil and pole piece center which is adapted to absorb heat from said coils which vaporizes said propellant gas passing therethrough.

15. The propulsion system of claim 14 further comprising
a flow meter positioned between said plenum and said vaporizing means to control the flow rate of the vaporized propellant gas into the plenum.

16. The propulsion system of claim 3 wherein said means for generating an alternating electric field is formed of a pair of spaced parallel plates which define a capacitor having a space between the parallel capacitive plates and wherein said means for generating an alternating magnetic field includes a plurality of spaced coils which are spaced relative to each other, said coils and said capacitor being electrically connected in series, resulting in the electric field being phase displaced from the magnetic field by 90°, said magnetic means being adapted to direct and concentrate the lines of magnetic force between the capacitive plates to establish an electric field which is located at substantially 90° relative to the magnetic field.

17. The propulsion system of claim 16 wherein said means for generating the alternating magnetic field includes a ferrite coil for further concentrating said magnetic lines of flux.

18. The means for generating a reactive thrust force of claim 2 wherein said means for generating an alternating current electric field is a pair of spaced parallel electrodes which are adapted to distribute charges on a controlled surface and to distribute the charges uniformly on the surface thereof to produce an electric field which extends in said first direction and which is adapted to intercept the magnetic field generated by said means for generating throughout the spatial region in the vicinity of the electrode an alternating magnetic field at substantially right angles to form a crossed dipole magnetic throughout said spatial region field which is substantially at a right angle to the electric dipole field.

19. The dipolar force field propulsion system of claim 1 further comprising
means including an excitation source of radiation positioned at a selected location on the system for producing a field of radiation; and
means including means defining a reflecting surface postion adjacent radiation field producing means for selectively positioning said reflective surface at a controlled angle relative to said excitation source to produce a thrust component of force in a selected direction causing said system to move in a direction opposite to said selected direction of a thrust component of force.

20. The propulsion system of claim 4 further comprising
a source of second neutral particles of matter which is of different species than the source of neutral particles of matter and wherein the second neutral particles of matter have a selected electron dipole characteristics, said second neutral particles of matter being capable of interacting with said neutral particles of matter which have been raised to an electronic excitation level enabling the atoms of said second neutral particles of matter to act as buffer atoms with said neutral particles of matter to permit optical pumping of the neutral particles of matter at raised electronic excitation levels.

21. The propulsion system of claim 20 further comprising
a laser adapted to optically pump said neutral particles of matter.

* * * * *